(12) United States Patent
Meiner et al.

(10) Patent No.: US 12,458,252 B2
(45) Date of Patent: Nov. 4, 2025

(54) MEDICAL SYSTEM

(71) Applicant: Roche Diabetes Care, Inc., Indianapolis, IN (US)

(72) Inventors: Emily Elise Meiner, Carmel, IN (US); Wolfgang Petrich, Bad Schonborn (DE); Valerie Winckler-Desprez, Ladenburg (DE); Uwe Hensel, Viernheim (DE)

(73) Assignee: ROCHE DIABETES CARE, INC., Indianapolis, IN (US)

( * ) Notice: Subject to any disclaimer, the term of this patent is extended or adjusted under 35 U.S.C. 154(b) by 0 days.

(21) Appl. No.: 16/598,630

(22) Filed: Oct. 10, 2019

(65) Prior Publication Data
US 2020/0054258 A1 Feb. 20, 2020

Related U.S. Application Data

(63) Continuation of application No. PCT/US2018/027251, filed on Apr. 12, 2018.
(Continued)

(51) Int. Cl.
*A61B 5/145* (2006.01)
*A61B 5/00* (2006.01)
*A61M 5/172* (2006.01)

(52) U.S. Cl.
CPC ........ *A61B 5/14532* (2013.01); *A61B 5/4839* (2013.01); *A61B 5/6833* (2013.01);
(Continued)

(58) Field of Classification Search
CPC ......... A61B 5/0022; A61B 5/01; A61B 5/024; A61B 5/0531; A61B 5/0533;
(Continued)

(56) References Cited

U.S. PATENT DOCUMENTS 5,413,690 A 5/1995 Kost et al.
5,762,770 A 6/1998 Pritchard et al.
(Continued)

FOREIGN PATENT DOCUMENTS

DE 954712 12/1956
DE 20020566 1/2002
(Continued)

OTHER PUBLICATIONS

International Search Report in PCT/US2018/027251 mailed Jul. 3, 2018.
(Continued)

*Primary Examiner* — Alex M Valvis
*Assistant Examiner* — Anna Roberts
(74) *Attorney, Agent, or Firm* — Woodard, Emhardt, Henry, Reeves & Wagner, LLP

(57) ABSTRACT

A medical system, an analyte measurement device, a medication device and a method for transcutaneously inserting an insertable element into a body tissue are disclosed. The medical system comprises:
- at least one electronics unit having at least one electronics component;
- at least one adhesive surface for attachment of the electronics unit to a skin site of a host;
- at least one first subsystem configured for being at least partially inserted into the host;
- at least one second subsystem, wherein the second subsystem comprises at least one secondary sensor, wherein the first subsystem and the second subsystem are operably connectable to the electronics unit, wherein the second subsystem is physically attachable to the medical system.

15 Claims, 11 Drawing Sheets

Related U.S. Application Data

(60) Provisional application No. 62/484,523, filed on Apr. 12, 2017.

(52) U.S. Cl.
CPC ... *A61M 5/1723* (2013.01); *A61B 2560/0214* (2013.01); *A61B 2560/0443* (2013.01); *A61B 2562/06* (2013.01)

(58) Field of Classification Search
CPC ..... A61B 5/1112; A61B 5/1118; A61B 5/145; A61B 5/14532; A61B 5/4839; A61B 5/6833; A61B 5/7275; A61B 2560/0214; A61B 2560/0443; A61B 2562/06; A61B 2562/0219; A61M 5/1723; G16H 40/67; G16H 50/30
See application file for complete search history.

(56) References Cited

U.S. PATENT DOCUMENTS

| | | |
|---|---|---|
| 5,798,031 A | 8/1998 | Charlton et al. |
| 6,129,823 A | 10/2000 | Hughes et al. |
| 6,360,888 B1 | 3/2002 | McIvor et al. |
| 2005/0013731 A1 | 1/2005 | Burke et al. |
| 2006/0253086 A1 | 11/2006 | Moberg et al. |
| 2008/0242962 A1 | 10/2008 | Roesicke et al. |
| 2011/0174638 A1* | 7/2011 | Katsuki ............. A61B 5/14503 205/792 |
| 2012/0029333 A1* | 2/2012 | Dogwiler .......... A61M 5/16854 604/113 |
| 2012/0078071 A1 | 3/2012 | Bohm et al. |
| 2013/0274576 A1* | 10/2013 | Amirouche ......... A61M 5/1408 604/151 |
| 2013/0298648 A1* | 11/2013 | Sun ....................... G01K 13/00 73/61.76 |
| 2014/0012116 A1* | 1/2014 | Okuyama .......... A61B 5/14532 600/347 |
| 2014/0052055 A1 | 2/2014 | Yodfat et al. |
| 2015/0141770 A1 | 5/2015 | Rastogi et al. |
| 2015/0224255 A1 | 8/2015 | Kamen et al. |
| 2016/0029778 A1* | 2/2016 | Fitzgerald ............... A45F 5/021 224/272 |
| 2017/0055890 A1 | 3/2017 | Kube et al. |
| 2017/0181698 A1* | 6/2017 | Wiedenhoefer ...... A61B 5/1121 |
| 2017/0290546 A1* | 10/2017 | Antonio ............. A61B 5/14503 |

FOREIGN PATENT DOCUMENTS

| | | |
|---|---|---|
| EP | 1 954 175 B1 | 7/2016 |
| WO | WO 2007/053963 A1 | 5/2007 |
| WO | WO 2012/050926 A2 | 4/2012 |
| WO | WO 2016/016217 A1 | 2/2016 |
| WO | WO 2017/037191 A1 | 3/2017 |

OTHER PUBLICATIONS

Written Opinion of the ISA in PCT/US2018/027251 mailed Jul. 3, 2018.

* cited by examiner

MEDICAL SYSTEM

FIELD OF THE INVENTION

The invention relates to a medical system, an analyte measurement device for detecting at least one analyte in a body fluid, a medication device for delivering at least one medication to a user and a method for transcutaneously inserting an insertable element into a body tissue. The devices and methods according to the present invention may mainly be used for long-term monitoring of an analyte concentration in a body fluid, such as for long-term monitoring of a blood glucose level or of the concentration of one or more other types of analytes in a body fluid. The invention may both be applied in the field of home care as well as in the field of professional care, such as in hospitals. Other applications are feasible.

RELATED ART

Monitoring certain body functions, more particularly monitoring one or more concentrations of certain analytes, plays an important role in the prevention and treatment of various diseases. Without restricting further possible applications, the invention will be described in the following text with reference to blood-glucose monitoring. However, additionally or alternatively, the invention can also be applied to other types of analytes.

Blood glucose monitoring, besides by using optical measurements, specifically may be performed by using electrochemical biosensors. Examples of electrochemical biosensors for measuring glucose, specifically in blood or other body fluids, are known from U.S. Pat. Nos. 5,413,690 A, 5,762,770 A, 5,798,031 A, 6,129,823 A or US 2005/0013731 A1.

In addition to so-called spot measurements, in which a sample of a bodily fluid is taken from a user in a targeted fashion and examined with respect to the analyte concentration, continuous measurements are increasingly becoming established. Thus, in the recent past, continuous measuring of glucose in the interstitial tissue (also referred to as continuous monitoring, CM) for example has been established as another important method for managing, monitoring and controlling a diabetes state.

In the process, the active sensor region is applied directly to the measurement site, which is generally arranged in the interstitial tissue, and, for example, converts glucose into electrical charge by using an enzyme (e.g. glucose oxidase, GOD), which charge is related to the glucose concentration and can be used as a measurement variable. Examples of such transcutaneous measurement systems are described in U.S. Pat. No. 6,360,888 B1 or in US 2008/0242962 A1.

Hence, current continuous monitoring systems typically are transcutaneous systems or subcutaneous systems, wherein both expressions, in the following, will be used equivalently. This means that the actual sensor or at least a measuring portion of the sensor is arranged under the skin of the user. However, an evaluation and control part of the system (also referred to as a patch) is generally situated outside of the body of the user, outside of the human or animal body. In the process, the sensor is generally applied using an insertion instrument, which is likewise described in U.S. Pat. No. 6,360,888 B1 in an exemplary fashion. Other types of insertion instruments are also known.

The sensor typically comprises a substrate, such as a flat substrate, onto which an electrically conductive pattern of electrodes, conductive traces and contact pads may be applied. In use, the conductive traces typically are isolated by using one or more electrically insulating materials. The electrically insulating material typically further also acts as a protection against humidity and other detrimental substances and, as an example, may comprise one or more cover layers such as resists.

As outlined above, in transcutaneous systems, a control part is typically required, which may be located outside the body tissue and which has to be in communication with the sensor. Typically, this communication is established by providing at least one electrical contact between the sensor and the control part, which may be a permanent electrical contact or a releasable electrical contact. Examples of electrical contacts for contacting a triangular assembly of contact pads are shown e.g. in DE 954712 B. Other techniques for providing electrical contacts, such as by appropriate spring contacts, are generally known and may be applied.

In order to avoid detrimental effects of the aggressive environment onto the conductive properties of the electrical contact, the region of the electrical contact is typically encapsulated and protected against humidity. Generally, encapsulations of electrical locks and contacts by using appropriate seals is known from e.g. DE 200 20 566 U1. Specifically in transcutaneous or subcutaneous sensors, in which the region of electrical contact between the sensor and the control part is close to the human skin, an efficient protection against humidity, dirt, sweat and detergents, such as detergents used for body care, is crucial.

In US 2015/0141770 A1 systems, methods and apparatuses that provide alerts based on analyte data and acceleration data are described. An analyte sensor may generate the analyte data. An accelerometer may generate the acceleration data. A transceiver may convert the analyte data into analyte concentration values. The transceiver may convert the acceleration data into activity information. The transceiver may generate an alert based on the analyte concentration values and activity information. The alert may be communicated to a user by a mobile medical application executed on the transceiver and/or a display device (e.g., smartphone) in communication with the transceiver. The mobile medical application may display (e.g., on a display of the display device) a plot or graph of the analyte concentration values and activity information with respect to time.

In WO 2012/050926 A2 systems and methods for processing, transmitting and displaying data received from a continuous analyte sensor, such as a glucose sensor, are described. In some embodiments, the continuous analyte sensor system comprises a sensor electronics module that includes power saving features. One feature includes a low power measurement circuit that can be switched between a measurement mode and a low power mode, in which charging circuitry continues to apply power to electrodes of a sensor during the low power mode. In addition, the sensor electronics module can be switched between a low power storage mode and a high power operational mode via a switch. The switch can include a read switch or optical switch, for example. A validation routine can also be implemented to ensure an interrupt signal is sent from the switch. The continuous analyte sensor can be physically connected to a sensor electronics module which is in direct wireless communication with a plurality of different display devices.

In EP 1 954 175 B1 an apparatus for determining a glucose level in body tissue or blood is described. The apparatus comprises an electrical detection device having an electrode arrangement for applying an electric field to the tissue or blood for measuring at least one first parameter describing a response of said tissue or blood to said electric field. Further, the apparatus comprises an optical detection device comprising a light source and a light detector for measuring at least one second parameter describing a transmission or reflection of light by said tissue or blood. Further, the apparatus comprises an evaluation circuitry for determining the glucose level from a combination of said first and second parameter. The light source is located to emit light through said electrode arrangement and/or said light detector is located to measure light transmitted through said electrode arrangement for measuring said second parameter in a part of said tissue or blood experiencing said electric field.

Despite the advantages and the progress achieved by the above-mentioned developments, specifically in the field of continuous monitoring technology, some significant technical challenges remain. Specifically, additional physical or physiological data may be required, specifically to help prevent hypo- and/or hyperglycemic events before they occur. Known techniques generally require a plurality of sensors which are located on different locations of a body of the patient.

PROBLEM TO BE SOLVED

It is therefore an objective of the present invention to provide a medical system, an analyte measurement device, a medication device and a method for transcutaneously inserting an insertable element into a body tissue which at least partially avoid the shortcomings of known devices and methods of this kind and which at least partially address the above-mentioned challenges. Specifically, devices and methods shall be disclosed which allow for easy manufacturing and simple handling processes by a user. Providing an all-in-one system which is carried by a patient for an extended period of time allows for tracking data from the different sensors in a continuous manner and thereby provides more context to the data.

SUMMARY OF THE INVENTION

This problem is solved by a medical system, an analyte measurement device, a medication device and a method for transcutaneously inserting an insertable element into a body tissue with the features of the independent claims. Preferred embodiments, which might be realized in an isolated fashion or in any arbitrary combination, are listed in the dependent claims.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

In a first aspect of the present invention, a medical system is disclosed. The medical system comprises at least one electronics unit having at least one electronics component. Further, the medical system comprises at least one adhesive surface for attachment of the electronics unit to a skin site of a host. The medical system further comprises at least one first subsystem configured for being at least partially inserted into the host. Further, the medical system comprises at least one second subsystem. The second subsystem comprises at least one secondary sensor. The first subsystem and the second subsystem are operably connectable to the electronics unit. The second subsystem is physically attachable to the medical system. It is a particular feature of the medical system that sensors are provided to simultaneously track and record a variety of data in order to allow for a more thorough analysis and a better understanding of the patient's condition.

As further used herein, the term "system" may refer to a group of at least two elements which may interact in order to fulfill at least one common function. The at least two components may be handled independently or may be coupled, connectable or integratable in order to form a common component. Thus, a system generally refers to a group of at least two elements or components which are capable of interacting in order to perform at least one common medical function, such as in order to perform at least one detection of at least one analyte in a body fluid and/or in order to contribute to a detection of the at least one analyte in the body fluid. The system generally may also be referred to as an assembly. The term "subsystem" may refer to a component or a part of an arbitrary system.

As generally used within the present invention, the term "medical system" may refer to an arbitrary system configured for conducting at least one medical analysis and/or at least one medical procedure. The medical system therefore generally may be an arbitrary system configured for performing at least one diagnostic purpose and/or at least one therapeutic purpose. In the following, without restricting further embodiments, the present invention mainly will be described in terms of a medical system configured for performing at least one diagnostic purpose and, specifically, a medical system comprising at least one analyte sensor for performing at least one analysis. The medical system generally may be used for detecting at least one analyte in a body fluid of a user. Specifically, the medical system may be used for long-term monitoring or continuous monitoring of an analyte concentration in the body fluid of the user, such as in a body fluid contained in a body tissue of the user.

The medical system specifically may comprise an assembly of two or more components capable of interacting with each other, such as in order to perform one or more diagnostic and/or therapeutic purposes, such as in order to perform the medical analysis and/or the medical procedure. Specifically, the two or more components may be capable of performing at least one detection of the at least one analyte in the body fluid and/or in order to contribute to the at least one detection of the at least one analyte in the body fluid. The medical system generally may also be or may comprise at least one of a medical device, a sensor assembly, a sensor system, a sensor kit or a sensor device.

The term "host" generally refers to an arbitrary human being or an animal to which the medical system may be applied. This may be independent from the fact that the human being or animal, respectively, may be in a healthy condition or may suffer from one or more diseases. As an example, the host may be a human being or an animal suffering from diabetes. However, alternatively or additionally, the invention may be applied to other types of host. The host may also be referred to as patient or user.

The term "body tissue" may generally refer to a cellular organizational level intermediate between cells and a complete origin. The body tissue may specifically be an ensemble of similar cells from the same origin that together carry out a specific function. Thereby, organs may then be formed by functional grouping together of multiple tissues. As an example for body tissue, interstitial tissue, i.e. connective tissue between cellular elements if a structure, may be named. As further used herein, the term "body fluid" may refer to a fluid which is typically present in a body or the body tissue of the user or the patient and/or which may be produced by the body of the user or the patient. Thus, as an example, the body fluid may be selected from the group consisting of blood and interstitial fluid. However, additionally or alternatively, one or more other types of body fluids may be used, such as saliva, tear fluid, urine or other body fluids. As further used herein, the term "skin site" may refer to an arbitrary part or area of a soft outer covering of an human being or an animal. The soft outer covering may specifically have multiple layers of ectodermal tissue and may guard underlying muscles, bones, ligaments and internal organs. Further, the soft outer covering may be covered with hair follicles or may be hairless. Exemplarily, the term "skin site" may refer to an area of an arm of the host. However, other embodiments may be feasible.

As described above, the medical system comprises a first subsystem and a second subsystem. The terms "first subsystem" and "second subsystem" may be considered as nomenclature only, without numbering or ranking the named elements, without specifying an order and without excluding a possibility that several kinds of first subsystems and several kinds of second subsystems may be present. Further, additional subsystems such as one or more third subsystems may be present. As used herein, a "subsystem" generally refers to a system which is part of a larger system which contains one or more further components.

As described above, the first subsystem is configured for being at least partially, e.g. fully or partially, inserted into the host. Thus, the first subsystem may be a transcutaneous subsystem. The term "transcutaneous" generally refers to a property of an arbitrary element of being adapted to be fully or at least partly arranged through the body tissue of the patient or the user. For this purpose, the element may comprise an insertable portion. In order to further render the element to be usable as a transcutaneous element, the element may fully or partially provide a biocompatible surface, i.e. a surface which, at least during durations of use, do not have any detrimental effects on the user, the patient or the body tissue. Further, the transcutaneous element generally may be dimensioned such that a transcutaneous insertion of the element into the body tissue is feasible, such as by providing a width in a direction perpendicular to an insertion direction of no more than 5 mm, preferably of no more than 2 mm, more preferably of no more than 1.5 mm. Thus, the term "subcutaneous" may generally refer to a property of an arbitrary element of being situated or lying under the skin and within the body tissue of the user or the patient. Specifically, the object may be configured to be introduced under the skin, exemplarily as an injection.

The first subsystem may exemplarily be or may comprise an analyte sensor for detecting at least one analyte in a body tissue. As further used herein, the term "analyte sensor" may refer to an arbitrary sensor which is adapted to perform a process of detection of at least one analyte and/or which is adapted to be used in the process of detection of at least one analyte. Thus, the analyte sensor specifically may be adapted to determine the concentration of the analyte and/or a presence of the analyte. The term "detection" generally refers to a process of determining a presence and/or a quantity and/or a concentration of the at least one analyte. Thus, the detection may be or may comprise a qualitative detection, simply determining the presence of the at least one analyte or the absence of the at least one analyte, and/or may be or may comprise a quantitative detection, which determines the quantity and/or the concentration of the at least one analyte. As a result of the detection, at least one signal may be produced which characterizes an outcome of the detection, such as at least one measurement signal. The at least one signal specifically may be or may comprise at least one electronic signal such as at least one voltage and/or at least one current. The at least one signal may be or may comprise at least one analogue signal and/or may be or may comprise at least one digital signal. Exemplarily, the analyte sensor may be configured for protruding from the electronics unit into the body tissue.

As further used herein, the term "analyte" may refer to an arbitrary element, component or compound which may be present in the body fluid and the presence and/or the concentration of which may be of interest for the user, the patient or medical staff such as a medical doctor. Particularly, the analyte may be or may comprise an arbitrary chemical substance or chemical compound which may take part in the metabolism of the user or the patient, such as at least one metabolite. As an example, the at least one analyte may be selected from the group consisting of glucose, cholesterol, triglycerides, lactate. Additionally or alternatively, however, other types of analytes may be used and/or any combination of analytes may be determined. The detection of the at least one analyte specifically may be an analyte-specific detection.

Exemplarily, the analyte sensor may be a transcutaneous electrochemical sensor. As used herein, an "electrochemical sensor" generally is a sensor which is configured to conduct an electrochemical measurement in order to detect the at least one analyte contained in the body fluid. The term "electrochemical measurement" refers to a detection of an electrochemically detectable property of the analyte, such as an electrochemical detection reaction. Thus, for example, the electrochemical detection reaction may be detected by comparing one or more electrode potentials. The electrochemical sensor specifically may be adapted to and/or may be usable to generate at least one electrical sensor signal which directly or indirectly indicates the presence and/or the extent of the electrochemical detection reaction, such as at least one current and/or at least one voltage. The analyte sensor may comprise at least two electrodes such as a working electrode which may have at least one test chemical being sensitive to the analyte to be detected, a reference electrode and/or a counter electrode. However, other embodiments may be feasible.

Further, the first subsystem may be or may comprise a medication device for providing at least one medication to the host. The term "medication device" generally refers to an arbitrary device which is configured to deliver a drug and/or a therapeutic agent to a patient via a specific route of administration. Such devices are commonly used as part of one or more medical treatments.

Specifically, the medication device may comprise at least one of a medication pump, specifically at least one insulin pump; a dosing tube; an infusion kit having a cannula for insertion into the body tissue. The medication pump may be fluidically coupled to the insertable element. The term "medication pump" generally refers to an arbitrary pump which is configured to move a drug and/or a therapeutic agent by mechanical action. Specifically, the medication pump may be an infusion pump which is configured to infuse an arbitrary medication into a patient's circulatory system. Generally, the infusion pump may be configured to be applied intravenously or subcutaneously. However, other applications are feasible. The term "fluidically coupled" may generally refer to a property of two or more elements such that an arbitrary fluid may be transferable between the two or more elements. The term "infusion cannula" may generally refer to an arbitrary cannula being configured to introduce an infusion, i.e. a liquid substance, specifically a liquid substance comprising a medicine, into the body tissue, exemplarily directly into a vein of the patient. Therefore, the infusion cannula may be attached to a reservoir comprising the liquid substance, specifically via the ex vivo proximal end of the infusion cannula. The infusion cannula may be part of an infusion kit. The term "infusion kit" may refer to an assembly of components which are required for a conduction of an arbitrary infusion. Thus, besides of the infusion cannula, the infusion kit may further comprise at least one fluid coupling for coupling the infusion kit to at least one medication device, preferably to at least one medication pump.

Specifically, the first subsystem may comprise at least one insertable element configured for inserting the first subsystem at least partially into the host. As further used herein, the term "insertable element" may generally refer to an arbitrary element which may be configured to be at least partially insertable into another object such that the insertable element may be situated at least partially located under the object or surrounded by an interior of the object. Specifically, the insertable element may be configured to be at least partially inserted into the body tissue, specifically under the skin of the patient. Therefore, the insertable element may specifically have an elongate shape with a small cross-section. The insertable element may specifically be or may comprise the analyte sensor or the infusion having a cannula for insertion into the body tissue.

Further, the medical system may comprise at least one insertion cannula configured for inserting the first subsystem into the host. As further used herein, the term "insertion cannula" may refer to an arbitrary element which may be insertable at least partially into an arbitrary body tissue, particularly in order to deliver or to transfer a further element. The insertion cannula may specifically be or may comprise a hollow tube or a hollow needle. The lumen may have a lumen configured to receive another element at least partially such as to receive the analyte sensor or parts of the medication device such as an infusion cannula of the medication device. Thus, the insertable element may be configured to support an insertion of the analyte sensor or of the infusion kit as described above or as will further be described below.

As described above, the second subsystem comprises the at least one secondary sensor. As further used herein, the term "secondary sensor" may be considered as nomenclature only, without numbering or ranking the named element, without specifying an order and without excluding a possibility that several kinds of secondary sensors may be present. A first sensor does not necessarily have to be present. Further, additional sensors such as one or more third sensors may be present.

The second subsystem may be formed as one component, specifically as one single component. As further used herein, the term "component" may refer to a constituent part or element of a system, specifically of a mechanical or of an electrical system. The component may form one unit or one assembly. Thus, the component may be configured to be handleable independently from other components of the system. Specifically, one or more of the secondary sensors may be localized on one common basis element such as one common substrate. Thus, the basis element and the one or more secondary sensors may form an assembly which may be handleable independently from other components of the medical system. Specifically, the second subsystem may be handleable independently from the first subsystem. As further used herein, the term "handleable independently" may refer to a property of an arbitrary object of being configured to be used, controlled, managed or dealt with independently from other objects of a system or an assembly, e.g. not influenced or controlled from the other objects of the system or the assembly. Specifically, the second subsystem may form the one component as outlined above and may be manufactured independently from the other components of the medical system. Further, the second subsystem may be physically attachable to the medical system, specifically to one or both of the body mount or the housing as described above or as will further be described below, independently from the other components of the medical system. Specifically, the second subsystem may be physically attachable to the medical system independently from the first subsystem. The second subsystem may be configured to be physically attached to the medical system after the first subsystem is physically attached to the medical system or vice versa. Further, the second subsystem may be configured to be electrically coupleable to the electronics unit independently from the first subsystem.

Further, the second subsystem may be formed as an add-on component. As further used herein, the term "add-on component" may refer to an arbitrary component which may be configured to be added to a system or an assembly independently from other components of the system or the assembly. Specifically, the component may be configured to be added as a supplement to the system or to the assembly. Further, the component may be configured to enhance the system or the assembly by giving it additional features and abilities.

As described above, the second subsystem is physically attachable to the medical system. The term "physically attachable" may refer to a property of an arbitrary element of being attachable, e.g. fixable or connectable, to another object by forming a physical contact or a physical connection. Thus, the second subsystem may be configured to form a mechanical connection to the medical system. Exemplarily, the second subsystem may be physically attachable to the medical system, specifically to one or both of the body mount or the housing as described above or as will further be described below, by at least one of a force-fit connection or a form-fit connection. As further used herein, the term "force-fit connection" may refer to a fastening between two or more components which is achieved by friction after the two or more components are pushed together, rather than by any other means of fastening. Thus, the force-fit connection may also be referred to as an interference fit connection, a press fit connection or as a friction fit. Further, the term "form-fit connection" may refer to a fastening between two or more components, specifically between two or more mating components, which is achieved by shaping the two mating components such that one or the other one of the two mating components, or both of the mating components, slightly deviate in size from a nominal dimension. One of the two mating components may slightly interfere with a space that the other one of the two mating components is taking up. Exemplarily, one of the two mating components may have a receptacle and the other one of the two mating components may have a protrusion. The receptacle may have a shape which is complementary to a shape of the protrusion. Thus, the protrusion may be receivable in the receptacle. The force-fit connection and/or the form-fit connection may specifically be a reversible connection. As further used herein, the term "reversible connection" may refer to an arbitrary mechanical connection between two or more components which is lockable and unlockable several times in such a manner that none of the two components is damaged during locking or unlocking of the mechanical connection. Specifically, the second subsystem may be physically attachable to the medical system by at least one mechanism selected from the group consisting of: a click-on mechanism, a sliding mechanism.

Specifically, the second subsystem may be fully or partially formed as a strip. As further used herein, the term "strip" may refer to an element having an elongated shape and a thickness, wherein an extension of the element in a lateral dimension exceeds the thickness of the element, such as by at least a factor of 2, preferably by at least a factor of 5, more preferably by at least a factor of 10 and most preferably by at least a factor of 20 or even at least a factor of 30. Exemplarily, the strip may be a flexible strip, e.g. the strip may be capable of being bent mechanically without breaking or getting damaged at least to a large extent. Exemplarily, the second subsystem may comprise at least one strip-shaped substrate and the at least one secondary sensor may be fixedly attached to at least one surface of the substrate. Specifically, the medical system may have a receptacle. As further used herein, the term "receptacle" may refer to an element of an arbitrary device which is configured to receive or hold an object. Thus, the receptacle may be configured to provide a free volume. Exemplarily, the receptacle may have a shape which is complementary to a shape of the object. The receptacle may be part of the body mount or the housing as described above or as will further be described below in more detail. The strip may be insertable into a receptacle of the medical system.

As further used herein, the term "sensor" may refer to an arbitrary device which is configured to detect events or changes in its environment, and then provide a corresponding output. Specifically, the sensor may be configured to detect at least one parameter concerning its environment. Specifically, the sensor may be adapted to perform a process of detection and/or which is adapted to be used in the process of detection. The term "detection" generally refers to a process of determining a presence and/or a quantity of at least one parameter. The detection may thus be or may comprise a qualitative detection, simply determining the presence of the parameter or the absence of the at least one analyte, and/or may be or may comprise a quantitative detection, which determines the quantity of the at least one parameter. As a result of the detection, at least one signal may be produced which characterizes an outcome of the detection, such as at least one measurement signal. The at least one signal specifically may be or may comprise at least one electronic signal such as at least one voltage and/or at least one current. The at least one signal may be or may comprise at least one analogue signal and/or may be or may comprise at least one digital signal. Further, the at least one signal specifically may be or may comprise at least one optical signal. Thus, the sensor may be configured as a transducer. Specifically, the second subsystem may be configured such that at least one surface of the second subsystem is in direct contact with the skin site of the host.

The secondary sensor of the second subsystem may be configured for collecting at least one of physiological data, physical data from the host. As further used herein, the terms "physiological data" and "physical data" may refer to data concerning organic processes of functions in an organism or in any parts of the organism of a living system such as a human being or an animal. Specifically, the physiological data may seek to understand mechanisms that work to keep the living system alive and functioning. The physiological data may specifically refer to mechanical, physical, and biochemical data of the living organism and of cells of the living organism. Generally, a biological basis of a study of physiological data may refer to an overlap of many functions of systems of the living system which may specifically be achieved through communication that occurs in a variety of ways such as electrical or chemical. The secondary sensor may exemplarily be based on an electrochemical and/or optical measurement principle. However, other embodiments may be feasible.

Exemplarily, the secondary sensor may comprise at least one sensor selected from the group consisting of: an activity sensor, a physiological sensor, a localization sensor, a motion sensor, an acceleration sensor, a tremor sensor, a temperature sensor, a sensor for measuring a skin sweat concentration, a hydrogenation sensor, a heart-rate sensor. However, other sensors may be feasible. Specifically, the second subsystem may comprise a plurality of the secondary sensors.

As further used herein, the term "activity sensor" may refer to an arbitrary sensor which is configured to monitor and/or to evaluate a state or a quality of activity or an object or a person being active. Thereby, activity may specifically refer to motion of a living organism wherein the living organism may move muscles. Exemplarily, the activity may include walking or doing sports. Thereby, the term "sports" may relate to an athletic activity requiring skill or physical prowess which aims to use, maintain or improve physical ability and skills. Specifically, the activity sensor may be configured to monitor steps, a pulse, a calorie consumption and/or a sleeping quality or sleeping habits. In order to receive exact data, the second subsystem may comprise the motion sensor. The term "motion sensor" may refer to an arbitrary sensor which is configured for reconstruct measurement disorders caused by motion artifacts. The term "acceleration sensor" may refer to an arbitrary sensor which is configured to monitor and/or to evaluate an acceleration, e.g. a change in velocity. Specifically, the acceleration sensor may be configured to determine an inertial force which works on a test mass.

The term "tremor sensor" may refer to arbitrary sensor which is configured for monitoring a vibratory movement, a vibration or a trembling of a user. Specifically, the term "tremor" may refer to an involuntary shaking of a body or of limbs of the user as from disease, specifically a neurological disease, fear, weakness or excitement.

Further, the term "physiological sensor" may refer to an arbitrary sensor which is configured to monitor and/or to evaluate data concerning organic processes of functions in an organism or in any parts of the organism of a living system such as a human being or an animal. Exemplarily, the physiological sensor may be configured to monitor and/or to evaluate at least one of physiological indices of stress and/or emotion, a heart rate, a temperature, a respiration rate (RR), a carbon dioxide saturation, an oxygen saturation. However, other embodiments may be feasible.

The term "localization sensor" may refer to an arbitrary sensor which is configured for monitoring a geographical position of a user. Specifically, the localization sensor may be configured to output a GPS signal. As further used herein, the term "GPS" refers to the Global Positioning System, also known as Navstar, which is a global navigation satellite system that provides location and time information in all weather conditions, anywhere on or near the earth where there is an unobstructed line of sight to four or more GPS satellites.

The term "temperature sensor" may refer to an arbitrary sensor which is configured to monitor and/or to evaluate a temperature of an arbitrary medium. Specifically, the temperature sensor may be configured for measuring at least one of: a skin temperature of the host; a temperature of an ambient atmosphere. The term "heart-rate sensor" may refer to an arbitrary sensor which is configured to monitor and/or to evaluate a speed of a heartbeat of a user. Specifically, the sensor may be configured to measure a number of contractions of the heart per minute. Generally, the heart rate can vary according to physical needs of the user, including a need to absorb oxygen and excrete carbon dioxide. Further, generally, activities that can provoke change include physical exercise, sleep, anxiety, stress, illness, and ingestion of drugs. Specifically, the heart-rate sensor may comprise at least one of an optical heart-rate sensor or an electrocardiography sensor. Further, the term "hydrogenation sensor" may refer to an arbitrary sensor which is configured to monitor and/or to evaluate a hydrogenation of a user. Specifically, the hydrogenation sensor may comprise at least one of a skin-impedance sensor, a skin-resistance sensor. The term "optical sensor" refers to a sensor which is configured to monitor and/or to evaluate an arbitrary parameter optically, e.g. by detecting at least one optical signal. Specifically, the optical sensor may be configured to measure at least one of a component of the body fluid, specifically blood oxygen, a composition of the body fluid.

As described above, the medical system comprises the at least one electronics unit. As used herein, the term "electronics unit" refers to an arbitrary device having at least one electronic component. Specifically, the electronics unit may comprise at least one sensor electronics component for one or more of performing a measurement with the sensor, performing a voltage measurement, performing a current measurement, recording sensor signals, storing measurement signals or measurement data, transmitting sensor signals or measurement data to another device. The electronics unit may specifically be embodied as a transmitter or may comprise a transmitter, for transmitting data. Other embodiments of the electronic components are feasible.

As described above, the first subsystem and the second subsystem are operably connectable to the electronics unit. The term "operably connectable" may specifically refer to a property of two or more objects of being capable of being connectable to each other such that they can interact with each other. Specifically, the first subsystem and the second subsystem may respectively be operably connectable to the electronics unit such that sensor signals may be transmitted from the first subsystem to the electronics unit or from the second subsystem to the electronics unit. Therefore, exemplarily, the electronics unit may comprise at least one interconnect device, preferably a printed circuit board, more preferably a flexible printed circuit board. However, other embodiments may be feasible.

Exemplarily, the first subsystem may be permanently operably connectable to the electronics unit. The term "permanently" may refer to an everlasting state intended to exist or function for a long, indefinite period without regard to unforeseeable conditions. On the contrary, the second subsystem may be reversibly operably connectable to the electronics unit. The term "reversibly" may refer to a state which is capable of being established, disconnected and reestablished several times, specifically in such a manner that none of the components which are involved in establishing and disconnecting the state are damaged at least to a large extent.

The electronics unit may comprise a housing which at least partially surrounds the electronics component. As generally used herein, the term "housing" may refer to an arbitrary element which is adapted to fully or partially surround and/or receive one or more elements in order to provide one or more of a mechanical protection, a mechanical stability, an environmental protection against moisture and/or ambient atmosphere, a shielding against electromagnetic influences or the like. Thus, the housing may simply provide a basis for attachment and/or holding one or more further components or elements. Additionally or alternatively, the housing may provide one or more interior spaces for receiving one or more further components or elements. Specifically, the second subsystem may be reversibly attachable to the housing.

Further, as described above, the medical system comprises the at least one adhesive surface for attachment of the electronics unit to the skin site of the host. As further used herein, the term "adhesive surface" may refer to a plane element, e.g. an element which may especially extend in two dimensions, which may be configured to be attachable to another surface and to bind to the other surface in a permanent manner. Exemplarily, the adhesive surface may be or may comprise at least one metal and/or plastic foil. Specifically, the adhesive surface may comprise at least one adhesive material such as a glue. Exemplarily, the adhesive surface may be embodied as a plaster. However, other embodiments may be feasible. Exemplarily, the adhesive surface may be a surface of the electronics unit or of the body mount as described above or as will further be described below in more detail.

Further, the medical system may comprise at least one body mount for mounting the medical system to the user. The term "body mount" may generally refer to an arbitrary device which is attachable to the skin site of the host. As an example, the body mount may comprise at least one base element having at least one flat surface which may rest on the host's skin. The flat surface may comprise the adhesive surface. The body mount may comprise at least one attachment component which is capable of connecting the body mount to the skin, such as at least one adhesive surface and/or at least one adhesive strip or plaster. Specifically, the body mount may comprise the at least one adhesive surface as described below or as will further be described above. However, other embodiments may be feasible. The electronics unit may be configured for being mechanically coupled to the body mount, specifically by a reversible mechanical connection, more specifically by one or more of a form-fit or a force-fit connection, specifically by a clip-on connection.

Specifically, the second subsystem may be physically attachable to the body mount. Specifically, the body mount may comprise at least one opening, wherein the second subsystem is received in the opening such that a first part of the second subsystem and a second part of the second subsystem are located on different sides of the body mount. More specifically, the first part may face the skin site and is at least partially surrounded by the adhesive surface of the body mount and the second part may face the electronics unit. However, other embodiments may be feasible.

Further, the medical system may comprise at least one medical system data communication device. As further used herein, the term "data communication device" may refer to an arbitrary element which is configured to transfer data, specifically measurement data from one device to another device or vice versa. As further used within the present invention, the term "measurement data" refers to arbitrary data acquired by using the first subsystem and/or the second subsystem. The measurement data may specifically comprise a plurality of measurement values acquired at subsequent points in time, such as over a time period of several hours, several days, several weeks or even several months. The measurement data preferably may be acquired in an analogue or digital electronic format. The measurement data further may be processed or pre-processed within a control device, such as by applying at least one evaluation or pre-evaluation algorithm to the measurement data. Thus, as an example, at least one algorithm may be applied to the measurement data, wherein the at least one algorithm transforms primary measurement data acquired by using the first subsystem or the second subsystem into secondary measurement data indicating the concentration of the analyte in the body fluid, such as by applying a known or predetermined relationship between the primary measurement data and the parameter to the primary measurement data, thereby generating secondary measurement data.

The medical system data communication device may be configured to communicate by wire or wirelessly with at least one external device, specifically with at least one external data storage device. As used herein, the term "external device" may be an arbitrary device independent from the medical system and which is adapted to receive data via wireless far-field communication. The at least one external device may be part of a kit or may be independent from the kit. As an example, the at least one external device may be a portable device having the capability of communicating via wireless far-field communication, such as a hand-held computer and/or a smartphone. Other examples are feasible. The external data storage device may be part of one of a visualizing device, specifically a mobile phone; a wristband; a wristwatch; a medical therapeutic device.

Further, the second subsystem may comprise at least one second subsystem data communication device which is configured to transfer data, specifically measurement data from one device to another device or vice versa by wire or wirelessly. Exemplarily, the second subsystem data communication device may be part of the medical system data communication device. Moreover, the second subsystem comprises at least one device selected from the group consisting of a data processing device, a data storage device, and an electronics power supply.

As used herein, a "kit" is an assembly of a plurality of components, wherein the components each may function and may be handled independently from each other, wherein the components of the kit may interact to perform a common function. Thus, the kit may comprise a plurality of components, wherein each component may be handled individually, independent from the other components and may perform at least one function independently, wherein, further, all components or groups of components comprising at least two of the components may be combined, such as by physically connecting these components, in order to perform a common function implying functionality from the connected components.

As used herein, the term "near-field communication", abbreviated by NFC, generally refers to a wireless transfer of data over short distances of up to 10 cm, generally having a low data transfer rate, such as a data transfer rate of no more than 424 kBit/s. As an example, the near-field communication may follow a passive standard, i.e. a standard in which one of the communication partners is a passive component which only answers communication requests received from the other partner, such as the standard defined in ISO 14443 and/or ISO 15693. Thus, preferably, the near-field communication may be an RFID communication, wherein, preferably, the wireless near-field communication device of the control device is the passive element of the RFID communication. Additionally or alternatively, other types of near-field communication may be used, such as near-field communications in which both partners of the communication are active partners, i.e. partners which may both send and receive communication requests. A near-field communication device preferably may comprise at least one communication component adapted to perform the near-field communication. Thus, as an example, the near-field communication device may comprise at least one antenna. As an example, the near-field communication device may comprise at least one RFID antenna, such as at least one RFID coil.

As used herein, the term "wireless far-field communication" generally refers to a wireless communication adapted to transmit data over long distances, such as distances of more than 10 cm. As an example, the wireless far-field communication may be an arbitrary long-range communication using electromagnetic waves in the radio frequency range, i.e. may be a radio communication. Thus, as an example, the wireless far-field communication device of the data transmission module may comprise at least one radio module, having at least one radio antenna, for transmitting the measurement data via radio transmission to the at least one external device.

In a further aspect of the invention, an analyte measurement device for detecting at least one analyte in a body fluid is disclosed. The analyte measurement device comprises at least one medical system as described above or as will further be described below. The medical system comprises at least one first subsystem having an analyte sensor for detecting the at least one analyte in the body fluid. Further, the analyte measurement device has at least one evaluation device interacting with the analyte sensor.

As further used herein, the term "analyte measurement device" generally refers to an arbitrary device configured for conducting at least one analytical measurement. The analytical measurement device may preferably be an electronic device. The analyte measurement device may be adapted to interact with the medical system, specifically with the insertable element, more specifically with the analyte sensor in order to derive at least one item of information of the analyte of the sample. Specifically, the analyte measurement device may be adapted to detect at least one signal produced by the analyte. Thus, the analyte measurement device may comprise at least one electronic evaluation device in order to derive the at least one item of information of the analyte from the at least one signal. Thus, the analyte measurement device may comprise at least one evaluation unit comprising at least one data processing device, such as a microcontroller.

In a further aspect of the present invention, a medication device for delivering at least one medication to a user is disclosed. The medication device comprises at least one medical system as described above or as will further be described below. Further, the medical system comprises at least one insertable element, wherein the insertable element comprises at least one of an infusion cannula or a dosing tube. Further, the medication device further comprises at least one medication pump fluidically coupled to the insertable element.

In a further aspect of the present invention, a method for transcutaneously inserting an insertable element into a body tissue is disclosed. The method comprises the method steps as given in the independent claims and as listed as follows. The method steps may be performed in the given order. However, other orders of the method steps are feasible. Further, one or more of the method steps may be performed in parallel and/or on a timely overlapping fashion. Further, one or more of the method steps may be performed repeatedly. Further, additional method steps may be present which are not listed.

The method comprises:
a) providing at least one medical system according to any one of the preceding embodiments referring to a medical system;
b) placing the medical system, specifically one or both of the body mount or the housing, onto the skin site of the host;
c) at least partially inserting the first subsystem into the host;
d) bringing the second subsystem at least partially into contact with the skin site of the host; and
e) operably connecting the first subsystem and the second subsystem to the electronics unit.

As further used herein, the term "placing onto the skin site of the host" may refer to a process of attaching an element onto the skin site of the host such as via the adhesive surface as described above or as will further be described below. Further, the term "bringing into contact" may refer to a process of placing two or more elements relative to each other such that the two or more elements are arranged in immediate proximity or association such as in a state of touching. Specifically, the two or more elements may be in direct contact to each other, e.g. with no intermediate element in between. Step c) may exemplarily be conducted before step d). Alternatively, step d) may be conducted before step c). Further, the medical system comprises at least one body mount for mounting the medical system to the user as described above or as will further be described below. During step e), the electronics unit may be attached to the body mount.

The proposed medical device, the analyte measurement device, the medication device and the proposed method for transcutaneously inserting an insertable element into a body tissue provide many advantages over known devices and methods.

Generally, continuous monitoring of glucose may help in reducing a number of hypoglycemic events, especially at night. In order to improve a prediction of hypoglycemic or hyperglycemic events, the continuous glucose monitoring sensors may be embodied with an implemented algorithm such as to generate alerts, exemplarily 20 minutes ahead of time, when a glucose concentration is predicted to exceed a normal range. Alternatively, additional physical or physiological data may be provided from multiple sensors, specifically to prevent hypoglycemic or hyperglycemic events before they occur. Generally, common medical systems may have an increased number of components, such as devices to be carried for data collections. Further, these devices may be located on different locations of the host.

The medical system according to the present invention may provide the second subsystem having the at least one secondary sensor as an add-on component, which may comprise a set of secondary sensors and that can be attached to the medical system, specifically to the body mount. Specifically, the second subsystem may be configured to be flexibly attached to the medical system. Further, the second subsystem may be integrated or docked to the medical system used by the host. Thus, there may be no additional devices or components on different locations of the body of the host. Specifically, a combination of the components of the medical system may build a closed singular unit.

The second subsystem may be embodied in the medical system. Specifically, the medical system may be configured for medication and dosing such as via an insulin pump. Specifically, the second subsystem may be part of the body mount, specifically of a patch, or a plaster. Further, the second subsystem may be formed as an extension device which is clicked on or docked on the medical system such as on the analyte measurement device for detecting the analyte in the body fluid or the medication device for delivering the medication to the user. Specifically, the extension device may be formed as a strip, which is inserted in the receptacle, specifically in a pocket, of the body mount, specifically of the patch. Exemplarily, the body mount, specifically the patch, may be configured to hold other components of the medical system such as the electronics unit. Further, the second subsystem may be configured to communicate wirelessly.

The second subsystem may be configured to communicate to the medical system such as to the medication device or to the analyte measurement device and/or to visualization and/or to other data storing devices like mobile phone by wire or wirelessly.

Summarizing the findings of the present invention, the following embodiments are preferred:

Embodiment 1: A medical system, comprising:
at least one electronics unit having at least one electronics component;
at least one adhesive surface for attachment of the electronics unit to a skin site of a host;
at least one first subsystem configured for being at least partially inserted into the host;
at least one second subsystem, wherein the second subsystem comprises at least one secondary sensor, wherein the first subsystem and the second subsystem are operably connectable to the electronics unit,
wherein the second subsystem is physically attachable to the medical system.

Embodiment 2: The medical system according to the preceding embodiment, wherein the first subsystem is permanently operably connectable to the electronics unit.

Embodiment 3: The medical system according to any one of the preceding embodiments, wherein the second subsystem is reversibly operably connectable to the electronics unit.

Embodiment 4: The medical system according to any one of the preceding embodiments, wherein the electronics unit comprises a housing which at least partially surrounds the electronics component.

Embodiment 5: The medical system according to the preceding embodiment, wherein the second subsystem is reversibly attachable to the housing.

Embodiment 6: The medical system according to any one of the preceding embodiments, wherein the electronics component comprises at least one sensor electronics.

Embodiment 7: The medical system according to any one of the preceding embodiments, wherein the medical system comprises at least one body mount for mounting the medical system to the user.

Embodiment 8: The medical system according to the preceding embodiment, wherein the body mount comprises the at least one adhesive surface.

Embodiment 9: The medical system according to any one of the two preceding embodiments, wherein the electronics unit is configured for being mechanically coupled to the body mount, specifically by a reversible mechanical connection, more specifically by one or more of a form-fit or a force-fit connection, specifically by a clip-on connection.

Embodiment 10: The medical system according to any one of the three preceding embodiments wherein the second subsystem is physically attachable to the body mount.

Embodiment 11: The medical system according to any one of the four preceding embodiments, wherein the body mount comprises at least one opening, wherein the second subsystem is received in the opening such that a first part of the second subsystem and a second part of the second subsystem are located on different sides of the body mount.

Embodiment 12: The medical system according to the preceding embodiment, wherein the first part faces the skin site and is at least partially surrounded by the adhesive surface of the body mount, wherein the second part faces the electronics unit.

Embodiment 13: The medical system according to any one of the preceding embodiments, wherein the second subsystem is formed as one component.

Embodiment 14: The medical system according to any one of the preceding embodiments, wherein the second subsystem is handleable independently from the first subsystem.

Embodiment 15: The medical system according to any one of the preceding embodiments, wherein the second subsystem is formed as an add-on component.

Embodiment 16: The medical system according to any one of the preceding embodiments, wherein the second subsystem is physically attachable to the medical system by at least one of a force-fit or a form-fit connection, specifically by at least one of a reversible force-fit or a reversible form-fit connection.

Embodiment 17: The medical system according to any one of the preceding embodiments, wherein the second subsystem is physically attachable to the medical system, specifically to one or both of the body mount or the housing, by at least one mechanism selected from the group consisting of: a click-on mechanism, a sliding mechanism.

Embodiment 18: The medical system according to any one of the preceding embodiments, wherein the second subsystem is configured to be clicked on or docked on the medical system, specifically on one or both of the body mount or the housing.

Embodiment 19: The medical system according to any one of the preceding embodiments, wherein the second subsystem is fully or partially formed as a strip, wherein the strip is insertable into a receptacle of the medical system.

Embodiment 20: The medical system according to the preceding embodiment, wherein the second subsystem comprises at least one strip-shaped substrate, wherein the at least one secondary sensor is fixedly attached to at least one surface of the substrate.

Embodiment 21: The system according to any one of the two preceding embodiments, wherein the strip is a flexible strip.

Embodiment 22: The medical system according to the preceding embodiment, wherein the second subsystem is operably connectable to the electronics unit via flexible electronics.

Embodiment 23: The medical system according to any one of the preceding embodiments, wherein the secondary sensor comprises at least one sensor selected from the group consisting of: an activity sensor, a physiological sensor, a localization sensor, a motion sensor, an acceleration sensor, a tremor sensor, a temperature sensor, a sensor for measuring a skin sweat concentration, a hydrogenation sensor, a heart-rate sensor, an optical sensor.

Embodiment 24: The medical system according to the preceding embodiment, wherein the localization sensor is configured for monitoring a geographical position of the host.

Embodiment 25: The medical system according to any one of the two preceding embodiments, wherein the temperature sensor is configured for measuring at least one of: a skin temperature of the host; a temperature of an ambient atmosphere.

Embodiment 26: The medical system according to any one of the three preceding embodiments, wherein the motion sensor is configured to reconstruct measurement disorders caused by motion artifacts.

Embodiment 27: The medical system according to any one of the four preceding embodiments, wherein the hydrogenation sensor comprises at least one of a skin-impedance sensor, a skin-resistance sensor.

Embodiment 28: The medical system according to any one of the five preceding embodiments, wherein the heart-rate sensor comprises at least one of an optical heart-rate sensor or an electrocardiography sensor.

Embodiment 29: The medical system according to any one of the six preceding embodiments, wherein the optical sensor is configured to measure at least one of a component of the body fluid, specifically blood oxygen, a composition of the body fluid.

Embodiment 30: The medical system according to any one of the preceding embodiments, wherein the secondary sensor of the second subsystem is configured for collecting at least one of physiological data, physical data from the host.

Embodiment 31: The medical system according to any one of the preceding embodiments, wherein the medical system comprises at least one medical system data communication device which is configured to communicate by wire or wirelessly with at least one external data storage device.

Embodiment 32: The medical system according to the preceding embodiment, wherein the external data storage device is part of one of a visualizing device, specifically a mobile phone; a wristband; a wristwatch; a medical therapeutic device.

Embodiment 33: The medical system according to any one of the preceding embodiments, wherein the second subsystem comprises at least one second subsystem data communication device which is configured to communicate by wire or wirelessly with at least one further data communication device.

Embodiment 34: The medical system according to any one of the preceding embodiments, wherein the second subsystem is configured such that at least one surface of the second subsystem is in direct contact with the skin site of the host.

Embodiment 35: The medical system according to any one of the preceding embodiments, wherein the second subsystem further comprises at least one device selected from the group consisting of: a data processing device, a data storage device, an electronic power supply.

Embodiment 36: The medical system according to any one of the preceding embodiments, wherein the first subsystem is selected from the group consisting of: an analyte sensor for detecting at least one analyte in a body tissue; a medication device for providing at least one medication to the host.

Embodiment 37: The medical system according to the preceding embodiment, wherein the analyte sensor is a transcutaneous sensor.

Embodiment 38: The medical system according to the preceding embodiment, wherein the transcutaneous sensor is configured for protruding from the electronics unit into the body tissue.

Embodiment 39: The medical system according to any one of the three preceding embodiments, wherein the analyte sensor is a transcutaneous electrochemical sensor.

Embodiment 40: The medical system according to any one of the four preceding embodiments, wherein the medical system comprises at least one insertion cannula configured for inserting the analyte sensor at least partially into the host.

Embodiment 41: The medical system according to any one of the six preceding embodiments, wherein the medication device comprises at least one of: a medication pump, specifically at least one insulin pump; a dosing tube; an infusion kit having a cannula for insertion into the body tissue.

Embodiment 42: The medical system according to any one of the preceding embodiments, wherein the first subsystem comprises at least one insertable element configured for being at least partially inserted into the host, specifically at least one insertable element selected from the group consisting of an analyte sensor and an infusion kit having a cannula for insertion into the body tissue.

Embodiment 43: An analyte measurement device for detecting at least one analyte in a body fluid, the analyte measurement device comprising at least one medical system according to any one of the preceding claims, wherein the medical system comprises at least one first subsystem having an analyte sensor for detecting the at least one analyte in the body fluid, the analyte measurement device further having at least one evaluation device interacting with the analyte sensor.

Embodiment 44: A medication device for delivering at least one medication to a user, the medication device comprising at least one medical system according to any one of the preceding embodiments referring to a medical system, wherein the medical device comprises at least one insertable element, wherein the insertable element comprises at least one of an infusion cannula or a dosing tube, wherein the medication device further comprises at least one medication pump fluidically coupled to the insertable element.

Embodiment 45: A method for transcutaneously inserting an insertable element into a body tissue, wherein the method comprises:
a) providing at least one medical system according to any one of the preceding embodiments referring to a medical system;
b) placing the medical system, specifically one or both of the body mount or the housing, onto the skin site of the host;
c) at least partially inserting the first subsystem into the host;
d) bringing the second subsystem at least partially into contact with the skin site of the host; and
e) operably connecting the first subsystem and the second subsystem to the electronics unit.

Embodiment 46: The method according to the preceding embodiment, wherein step c) is conducted before step d).

Embodiment 47: The method according to any one of the two preceding embodiments, wherein step d) is conducted before step c).

Embodiment 48: The method according to any one of the three preceding embodiments, wherein the medical system comprises at least one body mount for mounting the medical system to the user, wherein, during step e), the electronics unit is attached to the body mount.

SHORT DESCRIPTION OF THE FIGURES

Further optional features and embodiments of the invention will be disclosed in more detail in the subsequent description of preferred embodiments, preferably in conjunction with the dependent claims. Therein, the respective optional features may be realized in an isolated fashion as well as in any arbitrary feasible combination, as the skilled person will realize. The scope of the invention is not restricted by the preferred embodiments. The embodiments are schematically depicted in the Figures. Therein, identical reference numbers in these Figures refer to identical or functionally comparable elements.

Figure 8A:
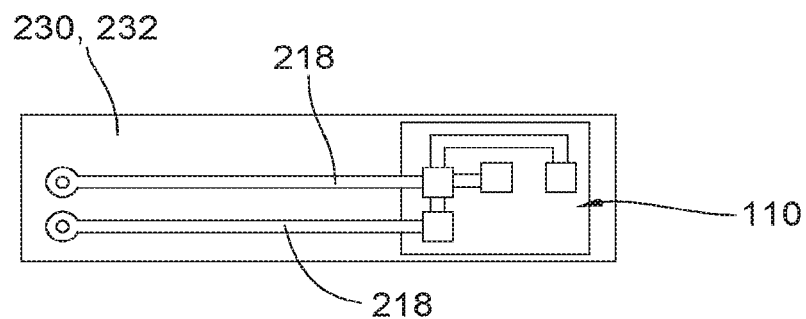
FIG. 8A illustrates an exemplary second subsystem.
Figure 8B:
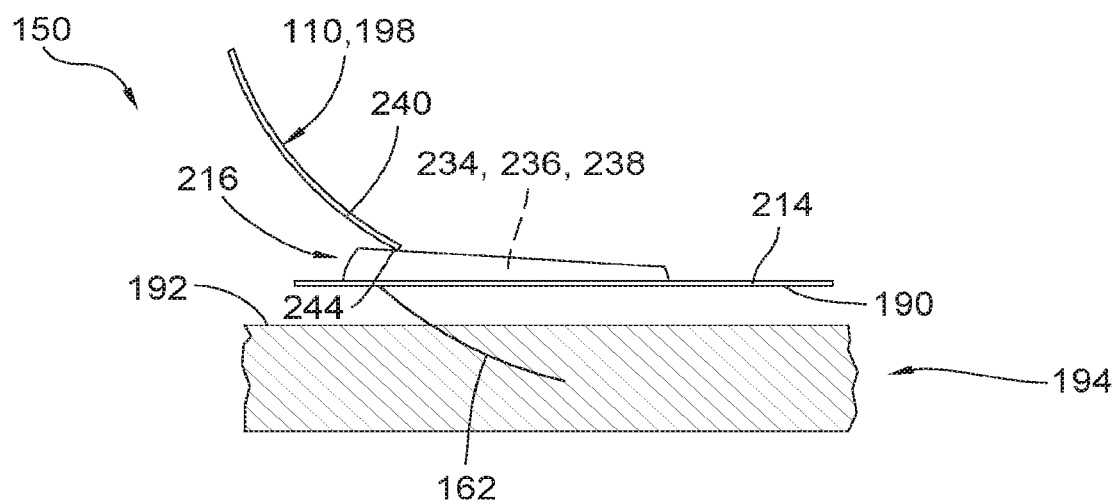
Figure 8C:
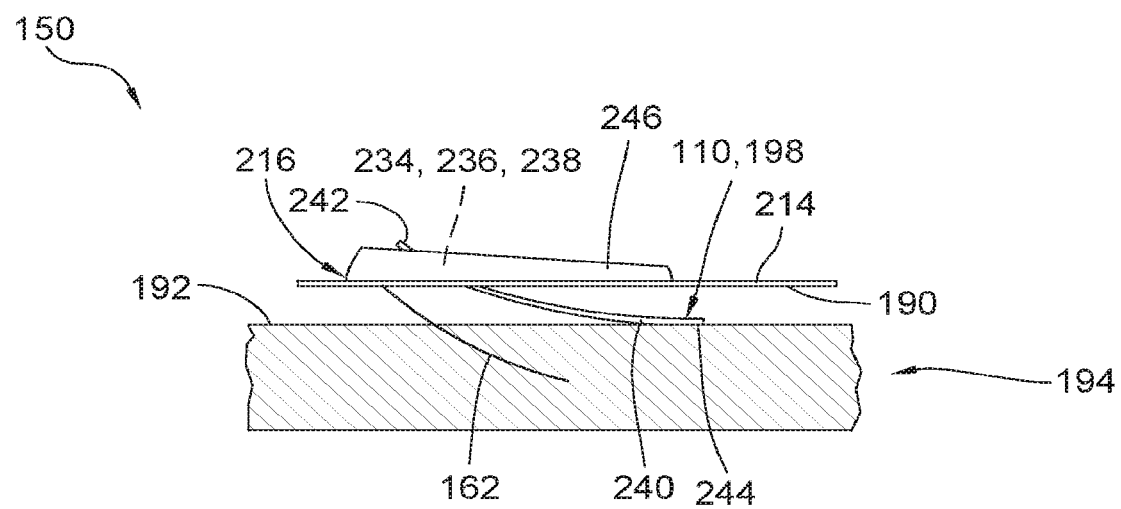
Figure 8D:
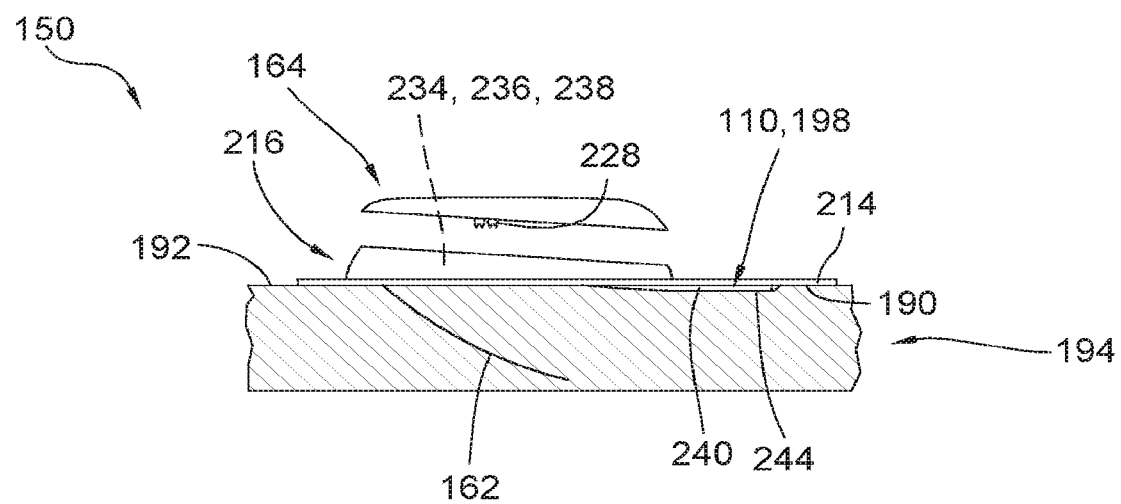

FIGS. 8B-D depict a medical system in different cross-sectional views being installed onto a patient.

Figure 9:
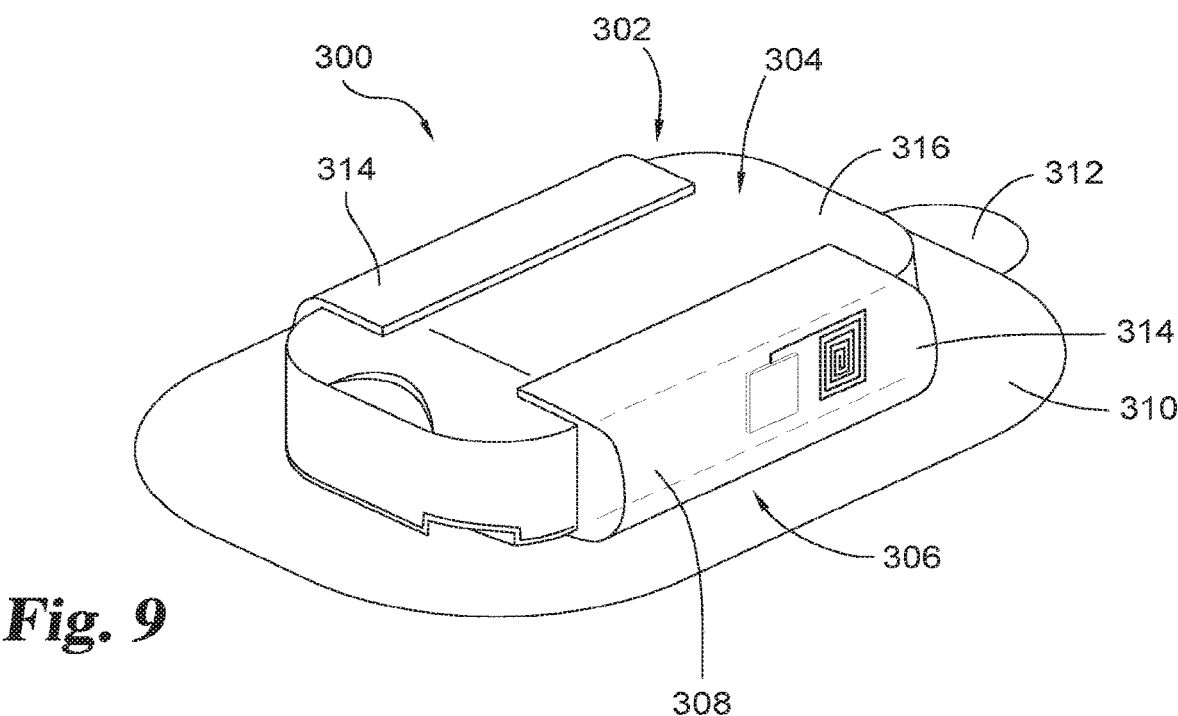

FIG. 9 is a perspective view of an embodiment of an exemplary CGM sensor system.

Figure 10:
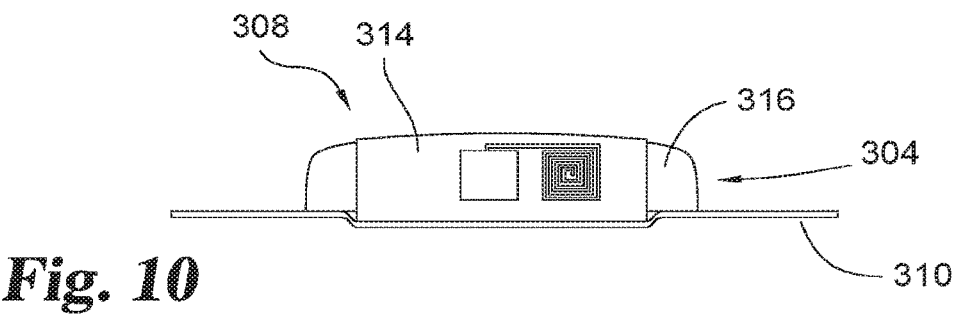

FIG. 10 is a side, elevational view of the exemplary CGM sensor system of FIG. 9.

Figure 11:
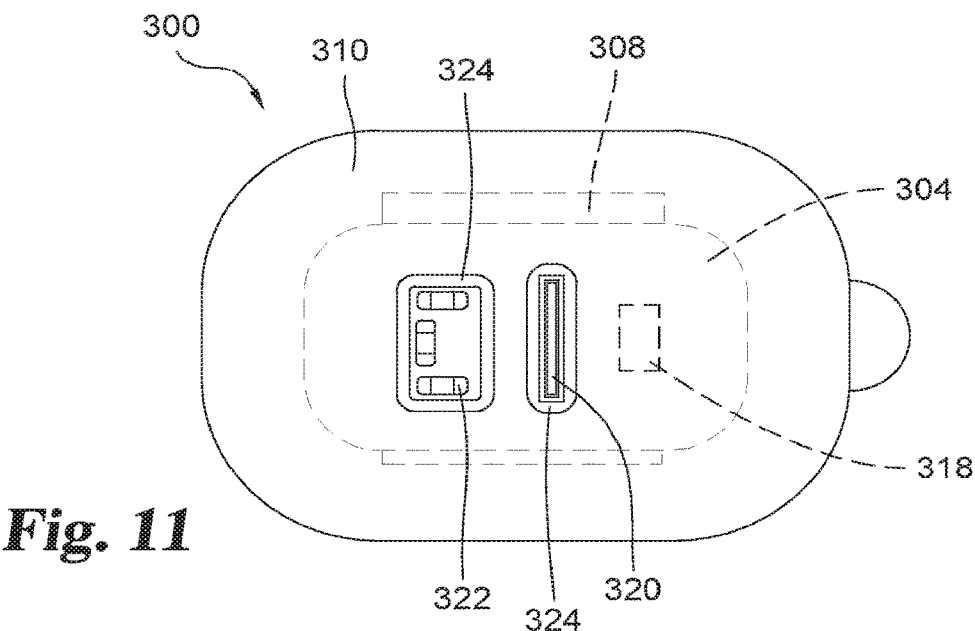

FIG. 11 is a bottom, plan view of the exemplary CGM sensor system of FIG. 9.

Figure 12:
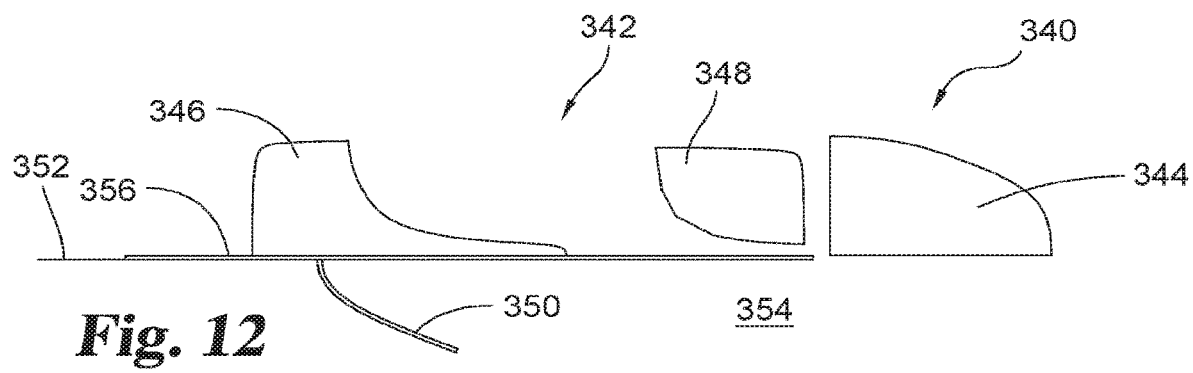
Figure 13:
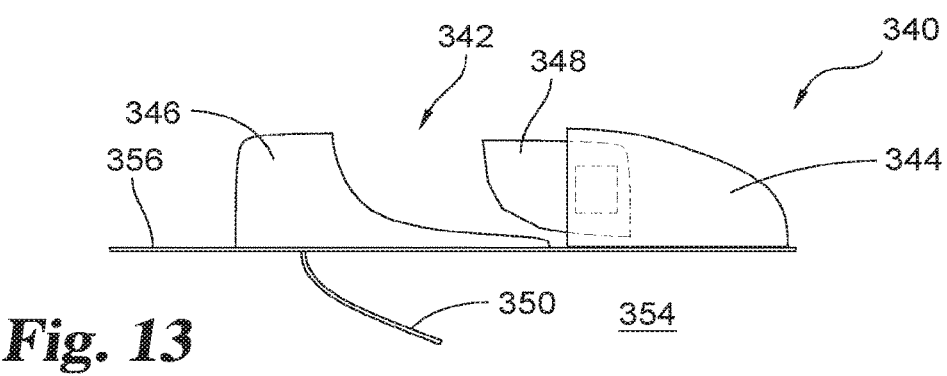
Figure 14:
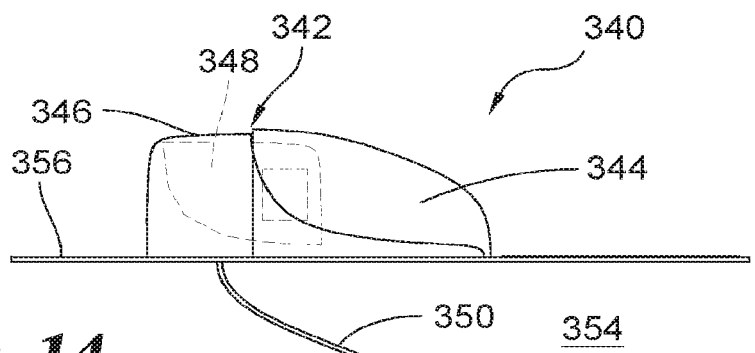

FIGS. 12-14 are diagrammatic side views of an alternative CGM sensor system showing the attachment of an implant component, an electronics component, and a sensor module.

Figure 15:
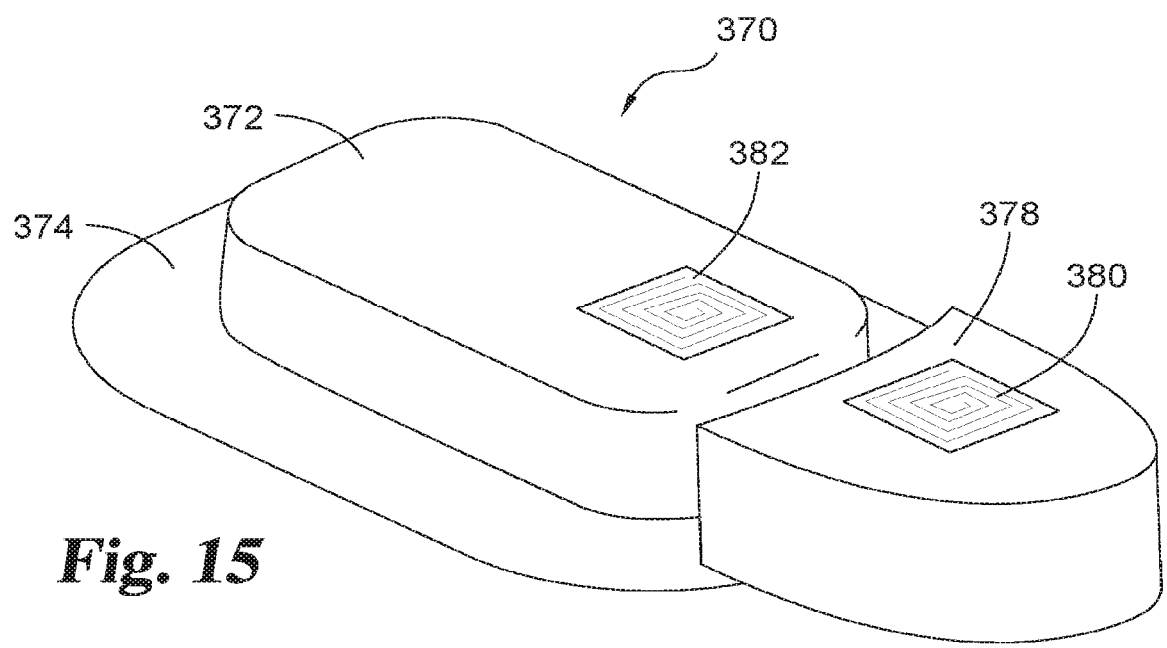

FIG. 15 is a perspective view of an additional, exemplary CGM sensor system.

Figure 16:
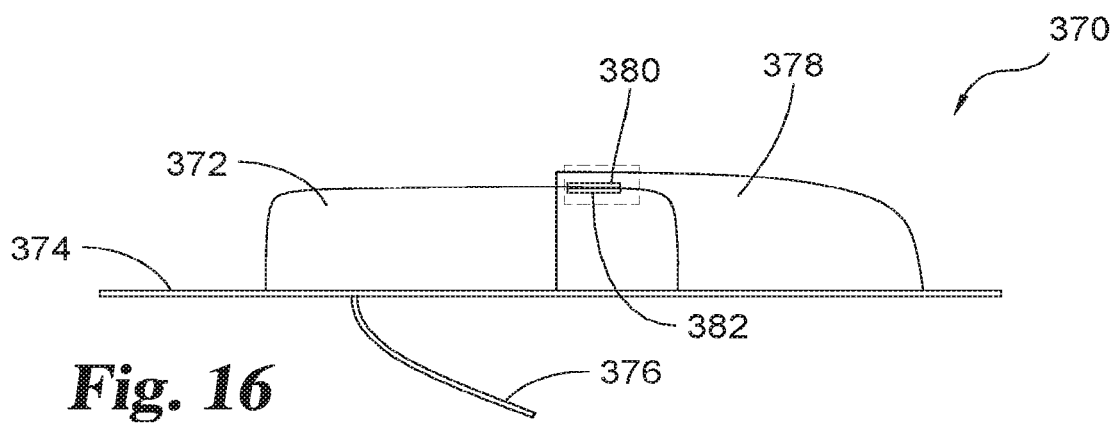

FIG. 16 is a side elevational view of the CGM sensor system of FIG. 15.

Figure 17:
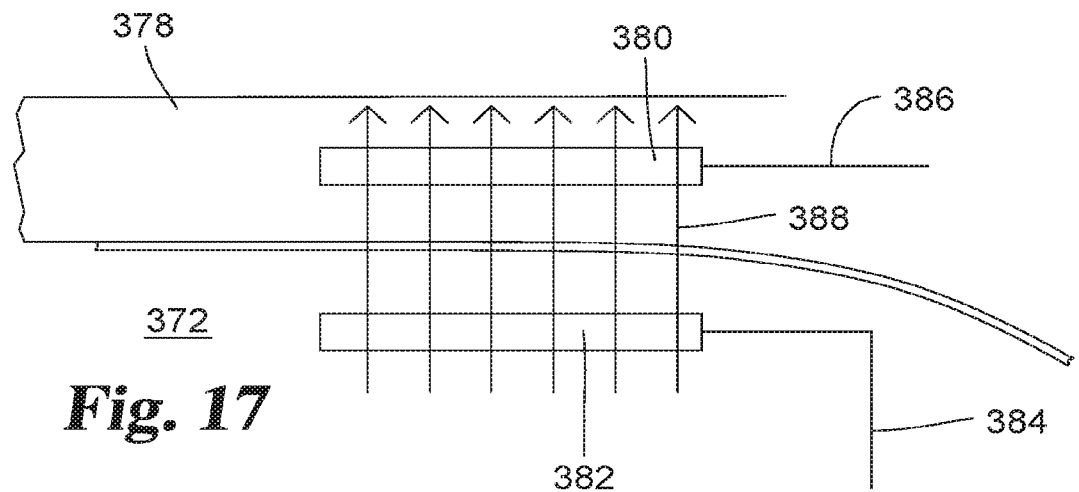

FIG. 17 is a diagram showing the operation of induction system useful for transferring power from a CGM to a sensor module for the CGM sensor system of FIG. 15.

Figure 18:
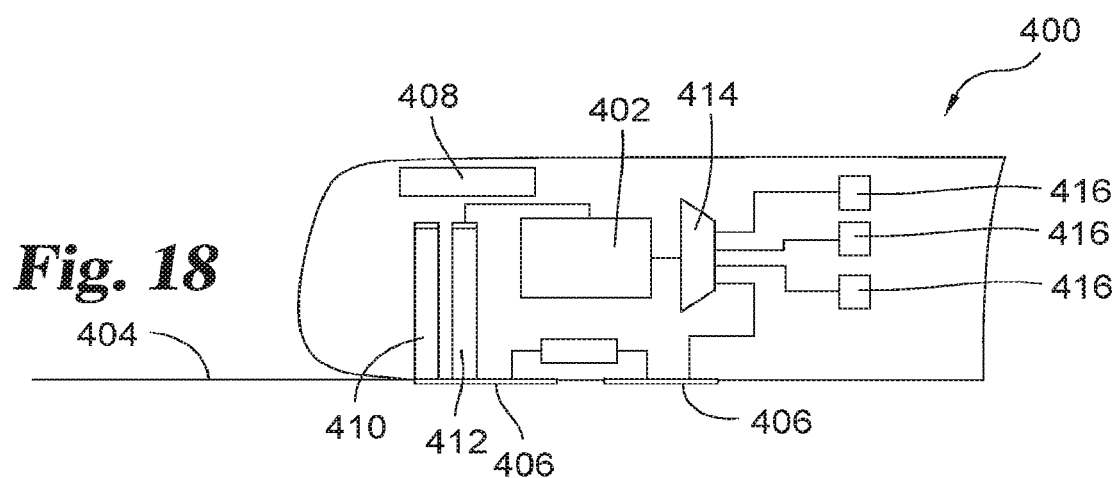

FIG. 18 is a diagram showing the configuration of a thermoelectric system for transferring power in the CGM sensor system.

Figure 19:
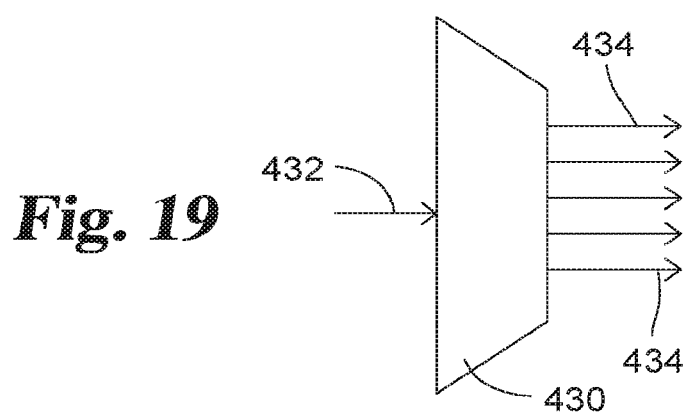

FIG. 19 is a diagram showing the configuration of a demultiplexer useful in connection with the CGM sensor system.

DETAILED DESCRIPTION OF THE EMBODIMENTS

Figure 1:
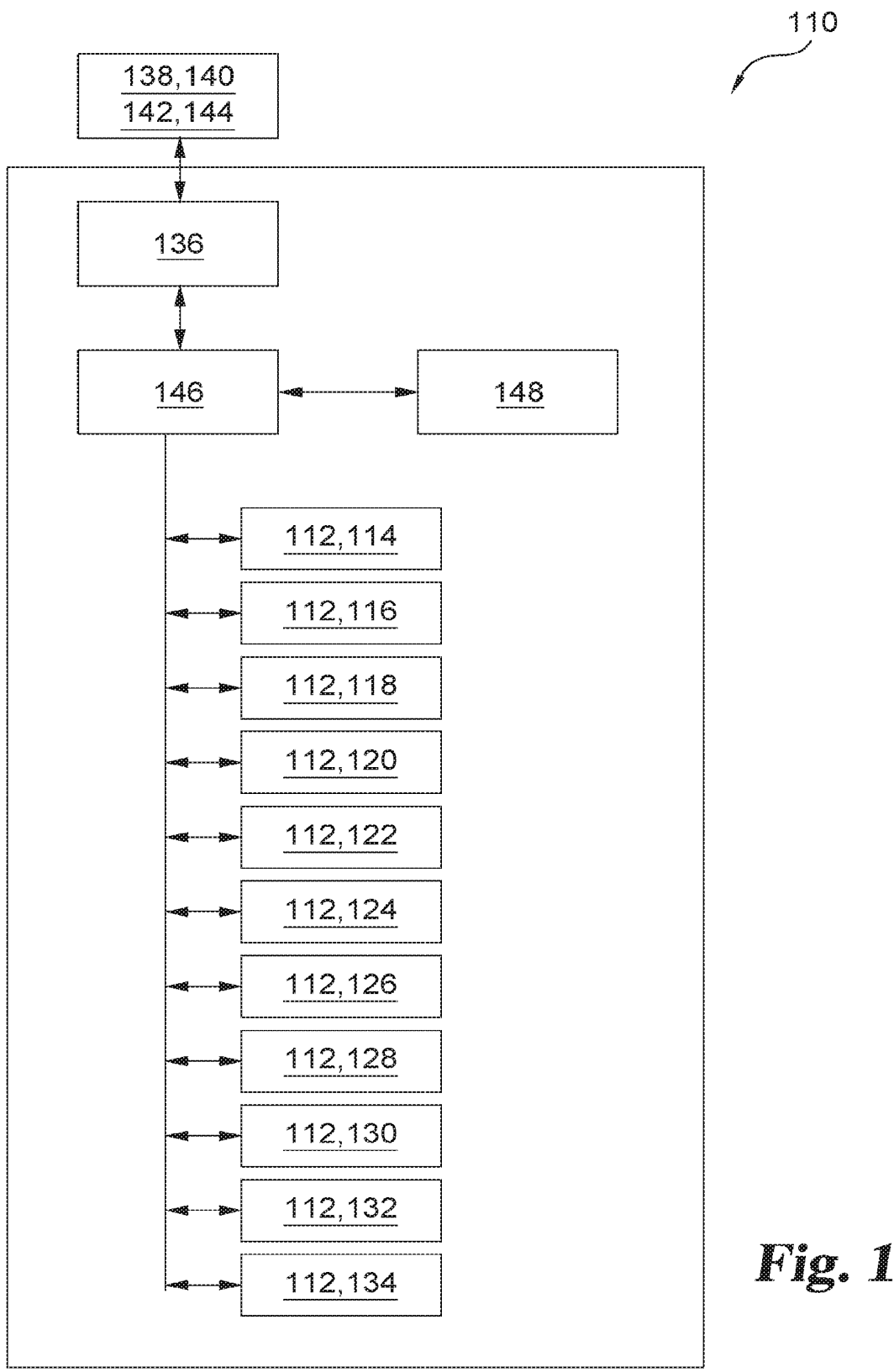
FIG. 1 shows a schematic view of an exemplary second subsystem.

In FIG. 1, a schematic view of an exemplary second subsystem 110 is shown. The second subsystem 110 comprises at least one secondary sensor 112. Specifically, the second subsystem 110 may comprise a plurality of secondary sensors 112. Exemplarily, the second subsystem may comprise at least one localization sensor 114, at least one tremor sensor 116, at least one temperature sensor 118, at least one sweat sensor 120, at least one motion sensor 122, at least one skin-impedance sensor 124, at least one heart-rate sensor 126 and at least one optical sensor 128. Further, the second subsystem 110 may comprise at least one activity sensor 130, at least one acceleration sensor 132 and at least one physiological sensor 134.

The secondary sensor 112 of the second subsystem 110 may be configured for collecting at least one of physiological data, physical data from a host. Thus, the second subsystem 110 may comprise at least one second subsystem data communication device 136 which is configured to communicate by wire or wirelessly with at least one further data communication device 138 such as a an external data communication device 140. Specifically, the external data communication device 140 may be a mobile device 142 such as a mobile phone 144. Therefore, the second subsystem 110 may further comprise at least one data processing device 146 and at least one data storage device 148.

Figure 2A:
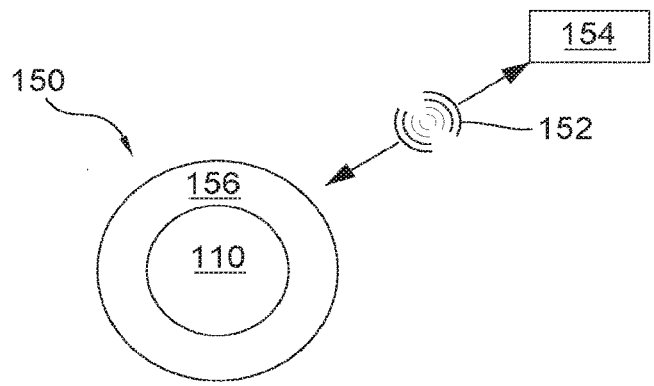
FIGS. 2A and 2B show schematic views of embodiments of an exemplary medical system.
Figure 2B:
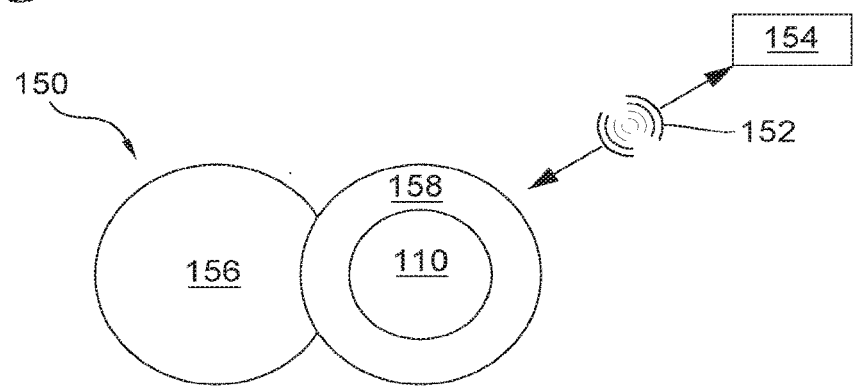

In FIG. 2A, a schematic view of an exemplary medical system 150 is shown. The medical system comprises the second subsystem 110. The second subsystem 110 may correspond at least in large parts to the second subsystem 110 as illustrated in FIG. 1. Thus, reference may be made to the description of FIG. 1 above. The second subsystem 110 may be part of a medical disposable 156. The medical disposable 156 may be used by the medical device 150. The medical system 150 may be configured to communicate wirelessly, as indicated by arrow 152 with at least one external device 154. In FIG. 2B, a further embodiment of the medical system 150 is depicted.

Figure 3A:
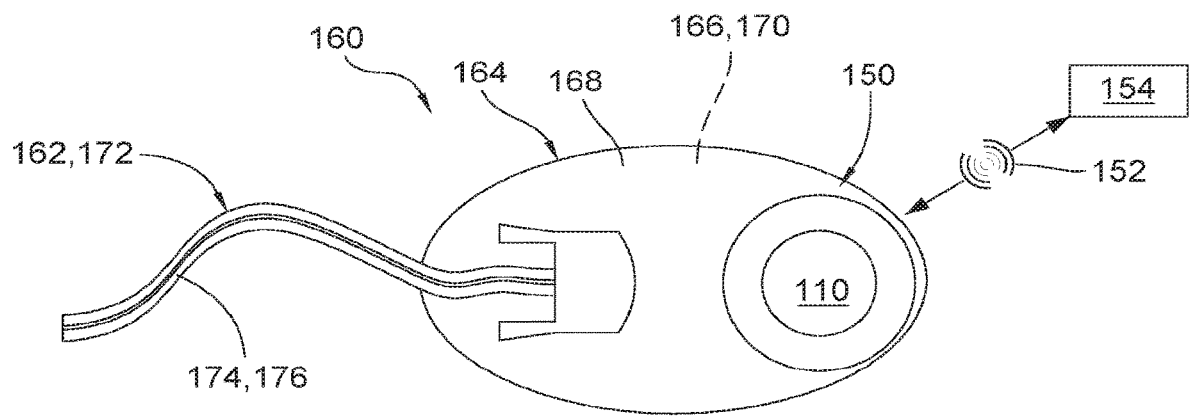
FIGS. 3A and 3B show schematic views of exemplary embodiments of a medication device.
Figure 3B:
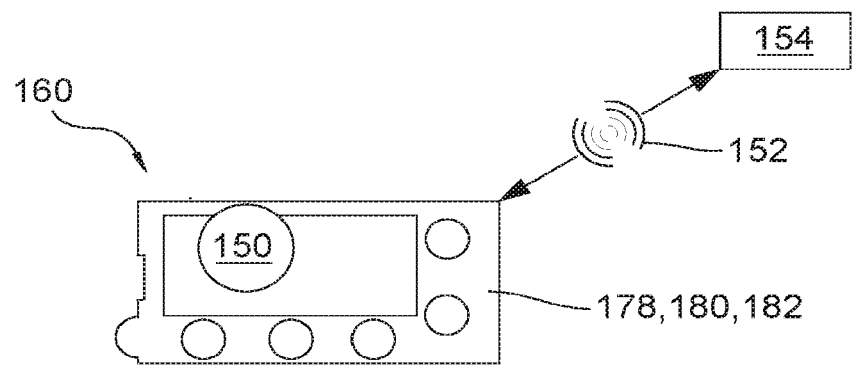

In FIGS. 3A and 3B, different embodiments of a medication device 160 are illustrated schematically. The medication device 160 comprises the at least one medical system 150. The medical system 110 may correspond at least in large parts to the medical system as illustrated in FIGS. 1 to 2B. Thus, reference may be made to the description of FIGS. 1 to 2B above.

As illustrated in FIG. 3A, the medical system 150 comprises at least one first subsystem 162 configured for being at least partially inserted into the host. Further, the medical system 150 comprises at least one electronics unit 164 having at least one electronics component 166. The electronics component 166 may comprise at least one sensor electronics 170.

Specifically, the first subsystem 162 may be permanently operably connectable to the electronics unit 164. On the contrary, the second subsystem 110 may be reversibly connectable to the electronics unit 164. Specifically, the electronics unit 164 may comprise a housing 168 which at least partially surrounds the electronics component 166. The second subsystem 110 may be reversibly attachable to the housing 168. The first subsystem 162 may specifically be a medication subsystem 172 for providing at least one medication to the host. Specifically, the medication subsystem 172 may comprise at least one infusion sleeve 174. The infusion sleeve 174 may be configured to power the medication device 160. Specifically, the infusion sleeve 174 may be a dual pole metallized infusion sleeve 176.

In FIG. 3B, a further embodiment of the medication device 160 is shown. Specifically, the medical system 150 may be part of a medical therapeutical device 178. Specifically, the medical therapeutical device 178 may be a patch pump 180 such as a durable pump 182. The medical therapeutical device 178 may be configured to communicate with the external device 154.

Figure 4:
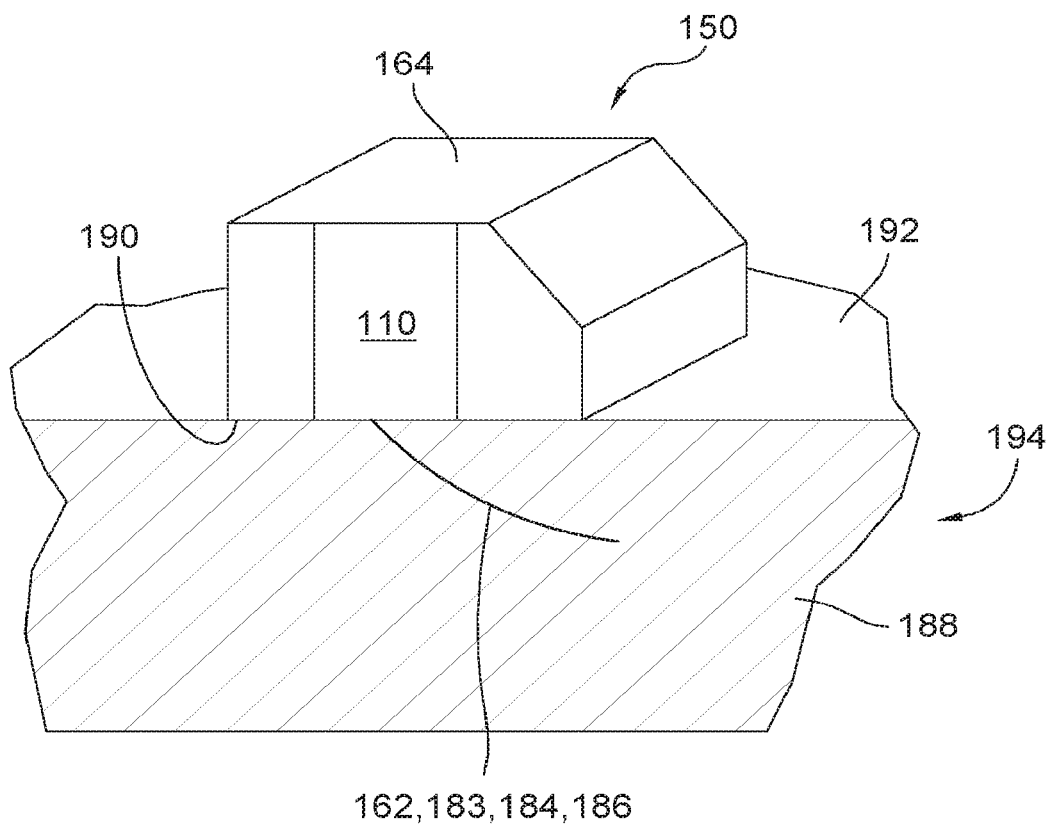
FIG. 4 shows an exemplary embodiment of a medical system.

In FIG. 4, an exemplary embodiment of the medical system 150 is shown schematically. The medical system 150 corresponds at least in large parts to the medical system 150 as illustrated in FIGS. 2A to 3B. Thus, reference may be made to the description of FIGS. 2A and 3B above.

The medical system 150 comprises the second subsystem 110. Further, the medical system 150 comprises the first subsystem 162. Specifically, the first subsystem 162 may be an insertable element 183 such as an analyte sensor 184 for detecting at least one analyte in a body tissue. Specifically, the analyte sensor 184 may be a transcutaneous sensor 186. The transcutaneous sensor 186 may be configured for protruding from the electronics unit 164 into the body tissue 188. Further, the medical system 150 comprises at least one adhesive surface 190 for attachment of the electronics unit 164 to a skin site 192 of a host 194.

Figure 5A:
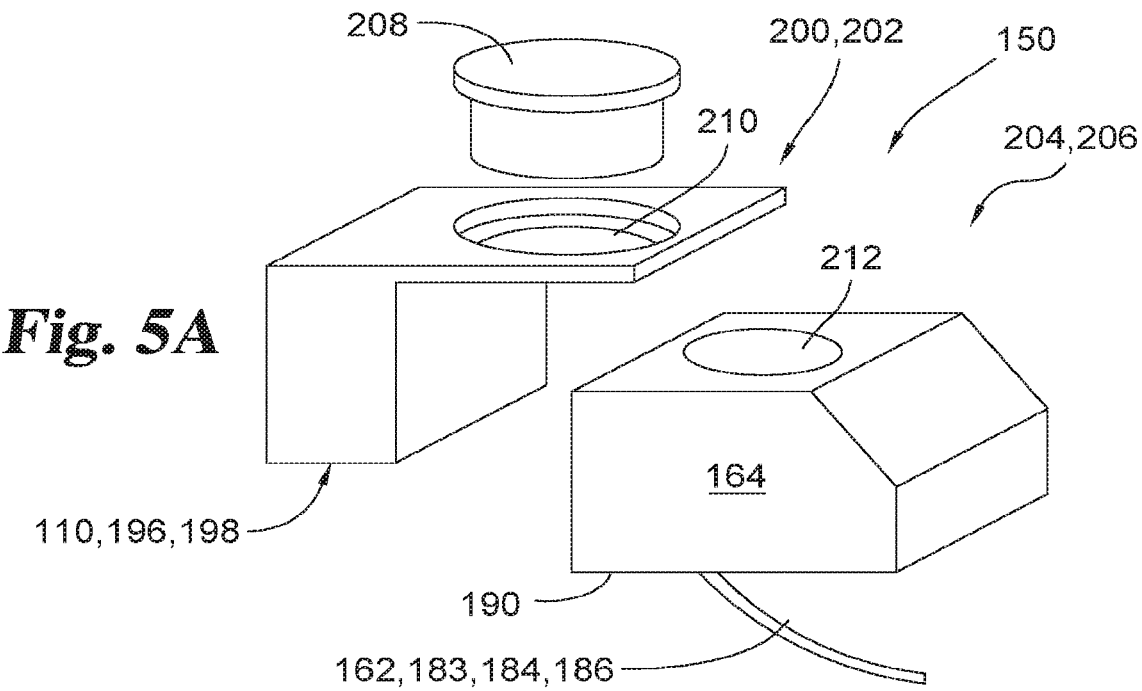
FIGS. 5A and 5B show exemplary embodiments of the medical system in a disassembled view (FIG. 5A) and in an assembled view (FIG. 5B)
Figure 5B:
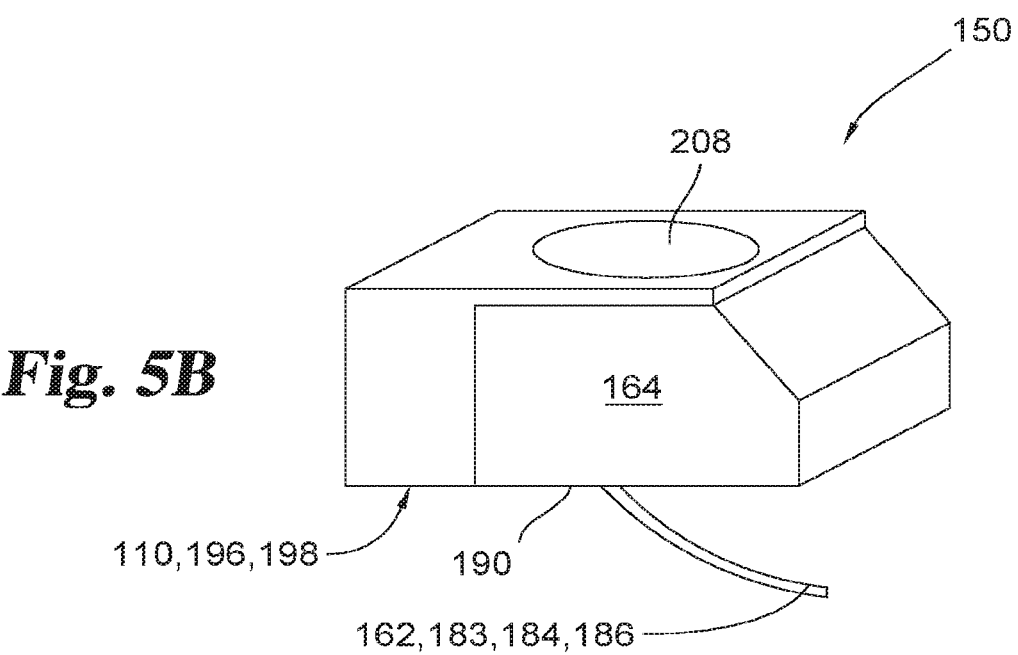

In FIGS. 5A and 5B, an exemplary embodiment of the medical system 150 is shown in a disassembled view (FIG. 5A) and in an assembled view (FIG. 5B). The medical system as illustrated in FIGS. 5A and 5B corresponds at least in large parts to the medical system 150 as illustrated in FIGS. 1 to 4. Thus, reference may be made to the description of FIGS. 1 to 4 above. The second subsystem 110 may be formed as one component 196. Specifically, the second subsystem 110 may be formed as an add-on component 198. Therefore, the second subsystem 110 may be handleable independently from the first subsystem 162.

The second subsystem 110 may be physically attachable to the medical system 150 by a form-fit connection 200 and a force-fit connection 202. Specifically, the second subsystem 110 may be physically attachable to the medical system 150 by at least one mechanism 204 such as a click-on mechanism 206. Exemplarily, the medical system 150 may have a contact element 208. The contact element 208 may be configured to be insertable in a receptacle 210 of the second subsystem 110 and of a receptacle 212 of the electronics unit 164. Thus, the contact element 208 may be configured to be clicked on or docked on the medical system 150, specifically to the electronics unit 164.

Figure 6:
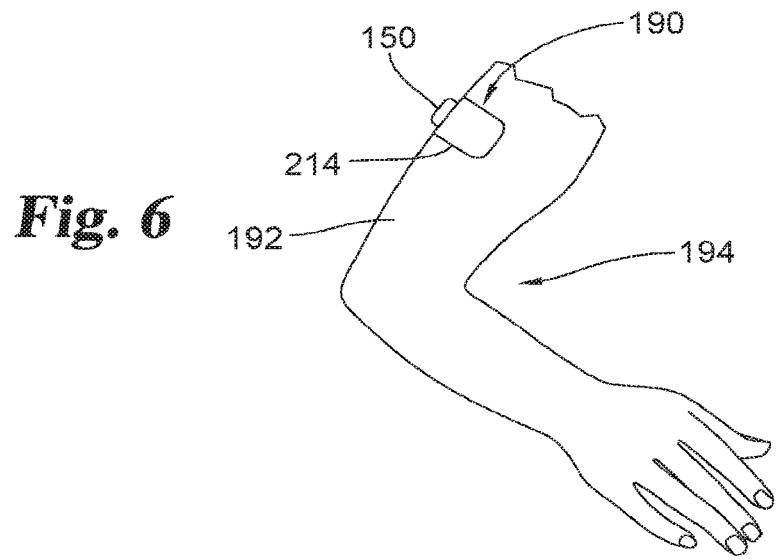
FIG. 6 shows a perspective view of a medical system.

In FIG. 6, a perspective view of the medical system 150 is shown. The medical system 150 corresponds at least in large parts to the medical system 150 as depicted in FIGS. 1 to 5B. Thus, reference may be made to the description of FIGS. 1 to 5B above. The medical system 150 may be physically attached to the host 194, specifically to the skin site 192 of the host. The medical system 150 may comprise the adhesive surface 190. Specifically, the adhesive surface 190 may be formed as a plaster 214 or may be part of the plaster 214 which is attached to the skin site 192 of the host.

Figure 7A:
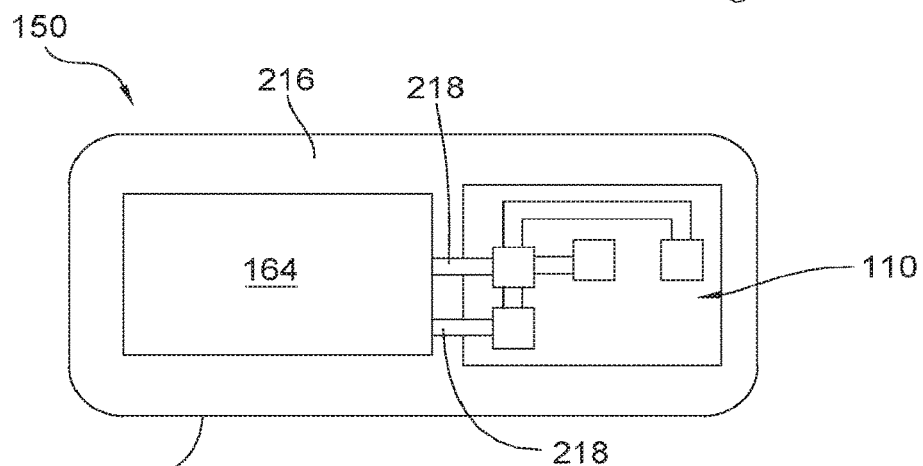
FIGS. 7A and 7B show different schematic views of an exemplary medical system.
Figure 7B:
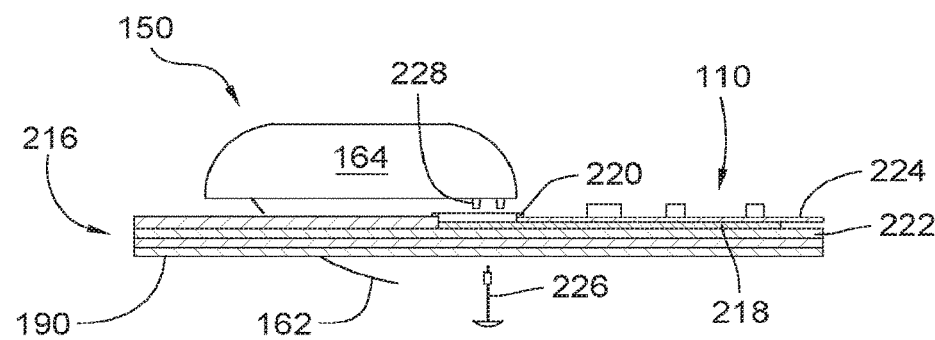

FIGS. 7A to 7B show different schematic views of a medical system 150. The medical system 150 corresponds at least in large parts to the medical system 150 as illustrated in FIGS. 1 to 6. Thus, reference may be made to the description of FIGS. 1 to 6 above.

As illustrated in FIG. 7A, the medical system 150 may comprise at least one body mount 216. The body mount 216 may be configured for mounting the medical system 150 to the host 194. Specifically, the body mount 216 may comprise the adhesive surface 190. The sensor subsystem 110 may be physically attached to the body mount 216. Specifically, the second subsystem 110 may be electrically contacted to the electronics unit 164 via flexible circuit wires 218. As illustrated in FIG. 7B, waterproofness of the body mount 216 may be ensured by an applied gasket ring 220 and a flexible isolation layer 222 and a resin 224. Specifically, the medical system 150 may further comprise a locking pin 226. The locking pin 226 may be configured to form a stable connection between the electronics unit 164 and the body mount 216. Thereby, the flexible circuit wires 218 may be electrically connected to the contact chips 228 of the electronics unit 164.

In FIGS. 8A to 8D, a schematic illustration of a second subsystem 110 (FIG. 8A) as well as different cross-sectional views of the medical system 150 are shown. The medical device 150 and the medical subsystem 110 correspond at least in large parts to the medical system 150 and the second subsystem 110 as illustrated in FIGS. 1 to 7B. Thus, reference may be made to the description of FIGS. 1 to 7B above.

As illustrated in FIG. 8A, the second subsystem 110 may be embodied as a strip 230, specifically as a flexible strip 232. In FIG. 8B, the medical system 150 is shown. The medical system 150 comprises the body mount 216. The body mount 216 may be fixedly attached to the adhesive surface 190 which may exemplarily be embodied as plaster 214. Thus, the body mount 216 may be physically attachable to the host 194, specifically to the skin site 192 of the host. Further, the medical system 150 may comprise the first subsystem 162. The first subsystem 162 may protrude from the body mount 216 and may be insertable into the host 194. Further, the second subsystem 110 may be provided as the add-on component 198.

As illustrated in FIG. 8C, the second subsystem 110 may be insertable in at least one receptacle 234 of the medical system 150, specifically of the body mount 216. The receptacle 234 may specifically be or form an opening 236, specifically a passage opening 238. Consequently, one part 240 of the second subsystem 110 may face the skin site 192 of the host 194 as well as the adhesive surface 190. Specifically, the part 240 such as at least one surface 244 of the part 240, may be in direct contact with the skin site 192 of the host 194. Further, one further part 242 may face an environment of the medical system 150. Further, as shown in FIG. 8C, the second subsystem 110 may be configured to be inserted into the receptacle 234 before the body mount 216 is attached to the skin site 192 via the adhesive surface 190. As illustrated in FIG. 8D, the electronics unit 164 may be configured to be attached to the body mount 216 after the body mount 216 has been attached to the skin site 192 of the host 194.

Diabetes Monitoring

An exemplary medical system comprising a continuous glucose monitor ("CGM") is useful for facilitating diabetes care management. Currently, diabetes management is rather difficult since blood glucose levels can be affected by several factors such as diet, stress, and even sleep. When a patient is diagnosed with diabetes, the doctor and patient spend a long period of time tweaking the patient's management plan based on observations from diet, exercise, stress patterns, and many other factors that affect that particular patient. There is a need to take the guesswork out of management plans, or at least to help the patient and doctor be better informed sooner after diagnosis.

Tracking in General

Being able to track activity and other biometrics along with blood glucose could help patients and doctors to increase awareness and identify trends in what makes blood glucose high or low. It also informs decisions in modifying diabetes management plans, and provides for tracking overall health. This can get patients actively involved in their health and lead to more effective treatment and medical care overall. By combining the sensors and communication systems of a CGM with other sensor units, patients and doctors have a holistic way to monitor the patient's biometrics and relate lifestyle factors to blood glucose levels. Such other sensor units may gather, often simultaneously, patient data points including body motion, skin temperature, skin conduction, heart rate, and blood oxygen. The algorithm behind the sensor attachment, using the information from these sensors, is able to estimate stress level, sleeping patterns, and exercise intensity levels.

In the following exemplary embodiments, additional patient data is made available to provide, for example, a more holistic view of the patient's health and behavior to better inform the doctor and the patient when making a diabetes management plan. This can decrease the number and amount of changes and the adjustment time for the patient. By adding sensors, such as those often seen in fitness tracking devices, in a module attached to a CGM, patients are able to track other aspects of their health at the same time as their blood glucose.

A sensor module is operatively coupled with a conventional CGM and provides supplemental sensing of relevant parameters. The module contains one or more sensors such as, but not limited to, an accelerometer to track steps and movement, LEDs and photodiodes to monitor heart rate and blood oxygen concentration (pulse oximetry), and electrodes to measure galvanic skin response to monitor stress. By simultaneously collecting this information for extended periods of time, it is possible to better track a patient's health and to adjust treatment protocols, particularly where the various sensors form an integrated and coordinated system. The sensor module is removable, allowing use of the CGM for blood glucose only, and offering versatility for patients and doctors.

First Embodiment

In particular, a CGM medical system 300 includes a first subsystem 302 comprising a CGM 304. CGM 304 may be of any design and functionality as known in the art. In exemplary fashion, the CGM includes a glucose sensor which extends through the skin and into the body of the patient. Medical system 300 further includes a second subsystem 306 comprising a sensor module 308. CGM 304 and/or sensor module 308 are secured to the patient's skin using an adhesive patch 310. In general, this skin attachment may be accomplished in any suitable manner as known in the art.

By way of example, as shown illustratively in FIGS. 9-11, sensor module 308 is attached to the skin. Module 308 is attached to adhesive patch 310 and prior to application a release liner 312 covers the adhesive surface of patch 310. Module 308 forms a U-shaped holder including arms 314 in which body 316 of CGM 304 is received, such as by a press or snap fit. Any of a variety of features may be included in the sensor module to complement the operation of the CGM or otherwise provide information useful in the management of the diabetes care program. Sensor module 308 includes, for example, accelerometer 318, galvanic skin response sensor 320, and LEDs/photodiodes 322. Adhesive patch 310 is provided with holes 324 to allow selected sensors, such as galvanic skin response sensor 320 and photodiodes 322, to be in direct contact with the skin.

CGM 304 is releasably attached to sensor module 308. The sensor module is attached to the CGM in a manner such that the functionality of the sensor module or of the CGM is not prevented or diminished. Conveniently, in the embodiment shown in FIG. 9, the adhesive patch may be replaced without separating the CGM from the sensor module. On the other hand, the CGM may be separated from the module and used by itself.

Second Embodiment

Referring to FIGS. 12-14, an alternative CGM sensor system 340 is illustratively shown as including CGM 342 and sensor module 344. CGM 342 comprises an implant component 346 and an electronics component 348. The implant component is adapted to provide transcutaneous implantation of the glucose sensor 350 through the patient's skin 352 and into the host patient 354, the body being secured to the skin by adhesive patch 356 and the glucose sensor being inserted transcutaneously. Various systems and methods to so place a CGM are known in the art, and may be used in combination with embodiments described herein.

Electronics component 348 is configured for removable attachment to implant component 346 by any suitable means, including a press or snap fit. Sensor module 344 is configured for attachment to electronics component 348 in any suitable manner, such as by a press or snap fit. Alternatively, sensor module 344 is configured to be attached directly to implant component 346, or to both implant component 346 and electronics component 348. Sensor module 344 may be attached while the implant component is attached to the electronic component, or when they are not attached.

As shown in FIGS. 12-14, in one approach sensor module 344 is first attached to electronics component 348 as shown in FIG. 13. The combined sensor module and electronics component are then attached to the implant component, as shown in FIG. 14. Alternatively, electronics component 348 is first attached to implant component 346, and sensor module 344 is then attached to electronics component 348 and/or implant component 346. For this embodiment, sensor module 344 may be readily separated from electronics component 348 and implant component 346 without the implant component being removed from placement on the skin. In this manner, the CGM may be used without the extra sensing capabilities if those features are not desired.

By way of example, implant component 346 is shown with adhesive patch 356 slightly extended beyond the immediate vicinity of implant component 346. The patch is provided with appropriately located openings to allow sensor contact with the patient's skin. Alternatively, the sensor module may be attached to the CGM while having a separate, independent adhesive patch securing the sensor module to the patient's skin.

The foregoing provides exemplary embodiments showing the attachment of a CGM and a sensor module. Other attachment methods and sensor module configurations and shapes could also be used, including in accordance with other disclosures herein. In a related aspect, the sensor module is attached to the CGM in a manner to be operatively coupled with, as well as physically attached to the CGM.

Power

The sensors of the sensor module may be powered in a variety of ways. The sensor module may include its own power, or it may obtain power from the CGM. Getting the power from the CGM may be by way of physical connections with the CGM, or by wireless means. In one approach, the CGM sensor system includes direct electrical connection between the CGM and the sensor module, such as by way of electrical connectors or contacts which are engaged upon attachment of the sensor module to the CGM. Wireless transfer of power is alternatively used.

Power—Near Field Coupling

FIGS. 15-17 show yet another example of a CGM sensor system. Sensor system 370 includes CGM 372 attached to adhesive patch 374 and having glucose sensor 376 extending transcutaneously into the patient. Sensor module 378 is received over and attached to CGM 372. This embodiment illustrates the use of near field coupling between CGM 372 and sensor module 378.

In this embodiment, sensor module 378 is powered by induction, drawing from the CGM power source. This removes the need for extra cables, wire connections or ports between the CGM and the sensor module, and avoids the use of extra batteries or a bulky power source. Methods of wirelessly powering the sensor module include near-field electrostatic induction (capacitive coupling) or near-field electromagnetic induction (inductive coupling). These methods require the coupled devices to be in close proximity to transfer power, so if there is no coupled device (sensor module) nearby, no energy is sent out from the transmitting device (CGM).

Inductive coupling is the near field wireless transmission of electrical energy between magnetically coupled coils, which are part of a resonant circuit tuned to resonate at the same frequency as the driving frequency. As shown in FIG. 16, upon attachment of the sensor module to the CGM, coil 380 on sensor module 378 is positioned above and immediately adjacent to coil 382 on CGM 372. CGM 372 is provided with appropriate electronics operable to inductively transfer power to sensor module 378 by means of inductive coupling through coils 380 and 382. These coils are used to produce and direct a magnetic field that is the result of induction produced by the power source in the CGM. The induced current in the sensor module is directed through regulating circuitry or components to power the components of the sensor module. With the low power requirements of the sensors in the sensor module, the required electromagnetic field is minimal.

The basic operation of such a system is shown schematically in FIG. 17. Coil 382 is located in CGM 372 and receives power from a power source 384. Coil 380 in sensor module 378 is connected to a regulating circuit 386. Arrows 388 represent the induced magnetic field.

Power—Thermoelectric

In another embodiment, the sensor module is powered by energy harvesting techniques, such as piezoelectric or thermoelectric systems. In a similar embodiment, one or more energy harvesting techniques are used to supplement the power drawn from the CGM to allow the CGM power source, if limited as in a battery, to last longer. In an embodiment using a thermoelectric system, one of the galvanic electrodes in contact with the patient's skin used for skin conduction is used as the "hot" side of the thermoelectric module, and the "cold" side is located as far away from the patient's body as possible to provide the largest possible temperature differential.

To further increase the temperature differential, the "cold" side is connected to a miniaturized cooling component or system. In embodiments using energy harvesting techniques, if the voltages produced are too low to power the sensor module, voltage amplification circuits or components, such as operational amplifiers or buck-boost converters, are used to bring the voltage up to a usable level.

Referring to FIG. 18, there is shown a thermoelectric powered sensor module 400, having voltage regulation and sensor power management circuitry 402, positioned adjacent the patient's skin 404. Using one of the galvanic skin response electrodes 406 as the conduit for the "hot" side of the thermoelectric system (the patient's body heat), and a cooling circuit or component 408 on the opposite side of the module away from the patient's body, the sensor module is powered by the temperature differential between p-type and n-type thermoelectric materials, 410 and 412, respectively. Depending on the voltage produced from the thermoelectric system, voltage regulation or amplification circuitry or components 402 may be necessary, and include operational amplifiers or buck-boost converters. This power is fed into a demultiplexer or demultiplexer-like circuitry 414, which allows certain sensors 416 to be turned off and on based on programming from a controlling device.

Power—Demultiplexer

Another embodiment for power management of the sensors in the sensor module involves a demultiplexer or "demux" 430 (or demultiplexer-like circuitry, that allows certain channels to be switched on and off) that controls the supplied power 432 from the CGM to each sensor 434. Demux 430 is used in combination with the power generation circuitry and the sensors. A controller or an app programs the demux to bypass certain sensors, allowing only certain sensors to be powered to generate data. Controlling the sensors separately allows personalized data gathering and power conservation. For example, if only the accelerometer data and heart rate data are desired, the temperature sensor and galvanic skin response components could essentially be turned off. The individual sensors in the accessory sensor module can be turned on and off by means of a wireless controller, or through an app in a display device such as a smartphone. In another embodiment, as a default, all sensors receive power at the same time in parallel based on each sensor's needs, but a switch allows power management with a demux to bypass certain sensors if desired.

Combinations of these and other power systems are contemplated. For example, the sensor module may be powered by energy harvesting techniques in addition to being powered by induction through the CGM power source. Sensor module power may be switched between energy harvesting techniques and power by induction through the CGM power source.

Communication

The sensor module may communicate with the CGM to transmit data, receive instructions or otherwise transfer information related to the operation of the CGM sensor system. Communication between the sensor module and the CGM may utilize a direct wired connection. Alternatively, a wireless connection between the sensor module and the CGM may be used.

The sensor module and/or the CGM may also communicate with external devices. The sensor module may communicate directly with such devices, or indirectly by way of the CGM. These communications may be by hard wire or wirelessly. The external devices include dedicated medical device systems, smartphones, PDAs, computers and the Internet. These devices are then used to evaluate the data with consideration given to a variety of factors which influence the patient's health. Other embodiments can include connectors or contacts for communication with the external devices.

The invention claimed is:

1. A medical system, comprising:
a body mount for mounting the medical system to the skin of a host, the body mount comprising an adhesive surface for attachment to a skin site of a host;
an electronics unit having an electronics component and a housing which at least partially surrounds the electronics component, the electronics unit being directly mechanically coupled to the body mount;
a first subsystem directly mechanically coupled to the body mount and configured for being at least partially inserted into the host, the first subsystem being directly, mechanically coupled to the electronics unit and being operably connected to the electronics unit through a wired connection; and
a second subsystem comprising a secondary sensor, the second subsystem being operably connected to the electronics unit,
the body mount comprising a passage opening and a receptacle configured to receive the second subsystem, the receptacle extending from the passage opening and through the body mount to receive the second subsystem positioned against the skin upon independent insertion by a user, the second subsystem extending through the passage opening and through the receptacle and having a part facing and in direct contact with the skin, and the second subsystem being reversibly, mechanically coupled with the electronics unit,
the receptacle being configured to allow for insertion of the second subsystem into the receptacle, and withdrawal of the second subsystem from the receptacle, with:
the body mount being mounted to the skin of the host, the first subsystem being coupled to the body mount, and the electronics unit being coupled to the body mount, and each of the body mount, the electronics unit, the first subsystem and the second subsystem being separately removable modules.

2. The medical system of claim 1, in which the electronics unit is mechanically coupled to the body mount by a reversible mechanical connection.

3. The medical system of claim 1, in which the electronics unit is connected to the body mount by a form-fit or a force-fit connection.

4. The medical system of claim 1, in which the second subsystem is operable to receive power from the first subsystem.

5. The medical system of claim 1, in which the first subsystem is an infusion cannula or a dosing tube.

6. The medical system of claim 1, in which the first subsystem is an analyte sensor for detecting at least one analyte in a body fluid and the second subsystem is at least one secondary sensor configured for collecting at least one physiological and/or physical data from the host.

7. The medical system of claim 6, in which the first subsystem is a continuous glucose monitor and the second subsystem is reversibly, mechanically connected to the continuous glucose monitor.

8. The medical system of claim 7, in which the continuous glucose monitor is operable to transfer operating power to the second subsystem.

9. A method for transcutaneously inserting an insertable element into a body tissue, wherein the method comprises:

a. placing the body mount of the medical system of claim 1 onto the skin site of the host with the first subsystem at least partially inserted into the host b. coupling the electronics unit to the body mount;

c. after step b, inserting the second subsystem into the passage opening and through the receptacle, and at least partially into contact with the skin site of the host; and d. operably and reversibly mechanically connecting the first subsystem and the second subsystem to the electronics unit.

10. The medical system of claim 1 in which the second subsystem is an add-on component.

11. The medical system of claim 1 in which the second subsystem is attached to the body mount by at least one of a force-fit connection and a form-fit connection.

12. The medical system of claim 1 in which the second subsystem is configured to be physically attached to the body mount before the first subsystem is attached to the body mount.

13. The medical system of claim 1 in which the second subsystem is configured to be physically attached to the body mount after the first subsystem is attached to the body mount.

14. The medical system of claim 1 in which the second subsystem is physically attached to the body mount and having a first part and a second part located on different sides of the body mount.

15. The medical system of claim 1 in which the receptacle allows for insertion of the second subsystem into the receptacle and withdrawal of the second subsystem from the receptacle with the first subsystem mounted to the skin of the host and the electronics unit coupled to the body mount.

* * * * *